Oct. 9, 1934.  F. HEDLEY ET AL  1,976,223
VEHICLE AND VEHICLE DOOR OPERATING MECHANISM
Filed Jan. 3, 1933  18 Sheets-Sheet 1
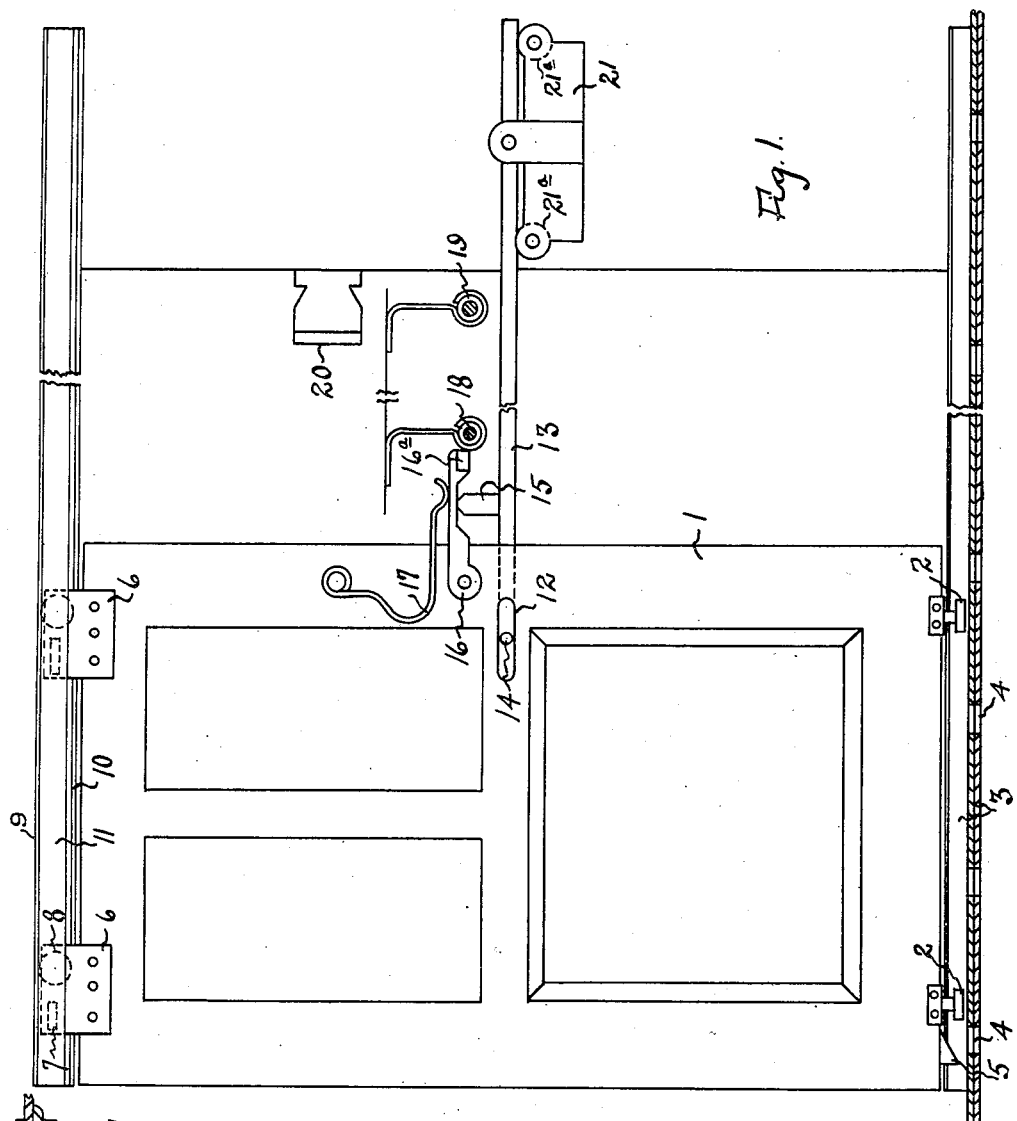
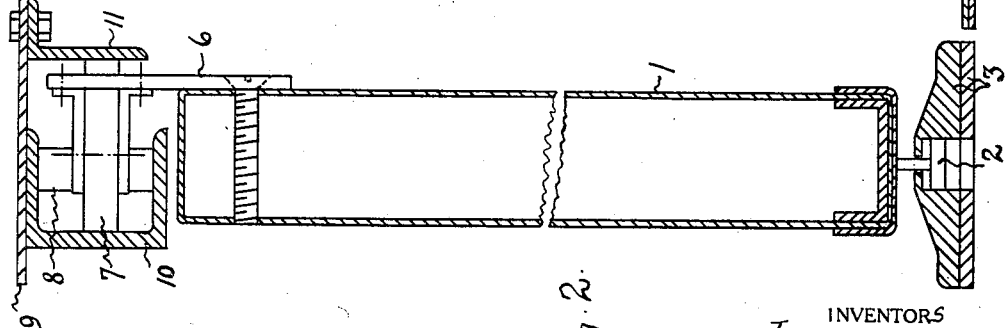
INVENTORS
James S. Doyle
Frank Hedley
BY Darby & Darby
ATTORNEYS

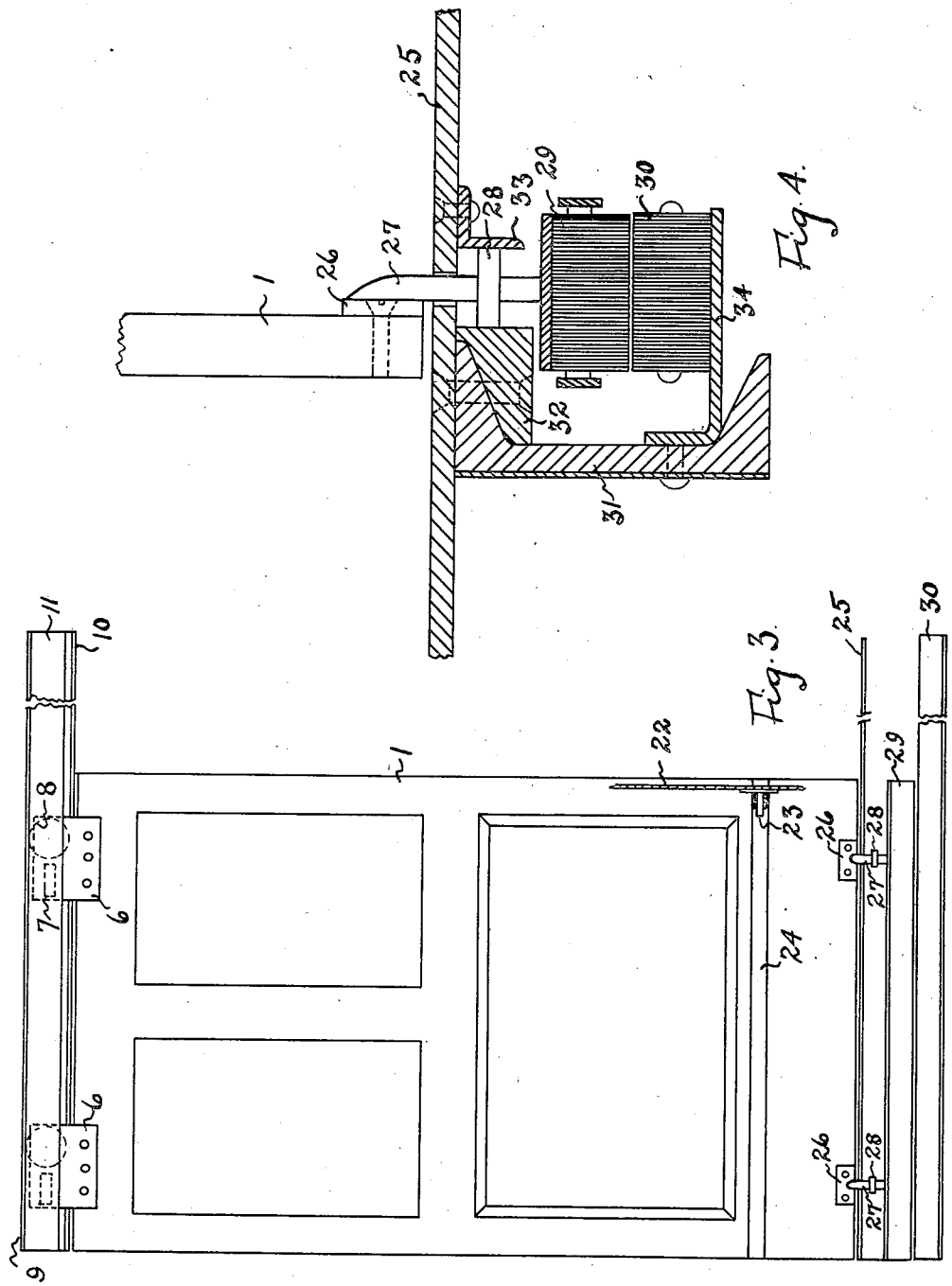

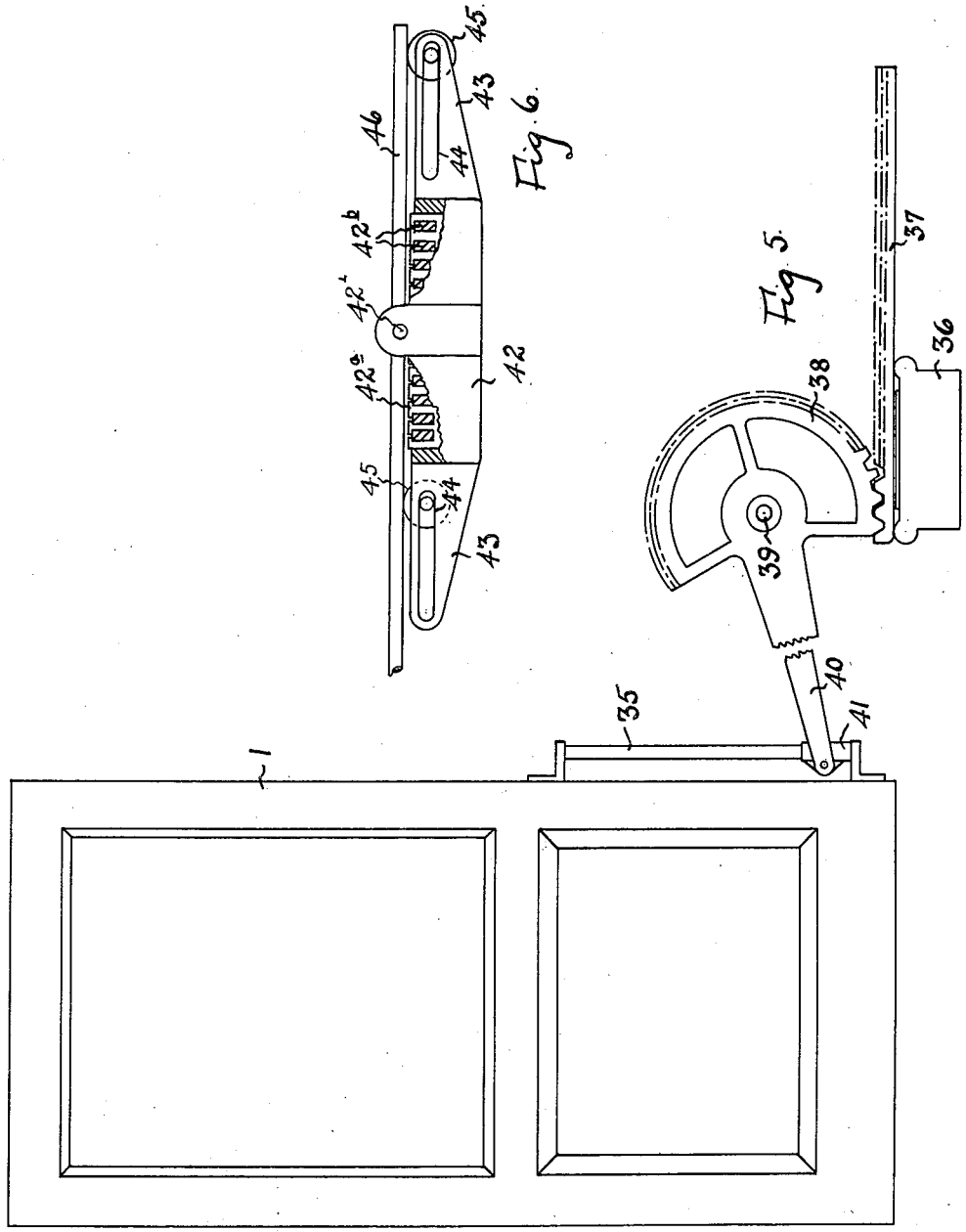

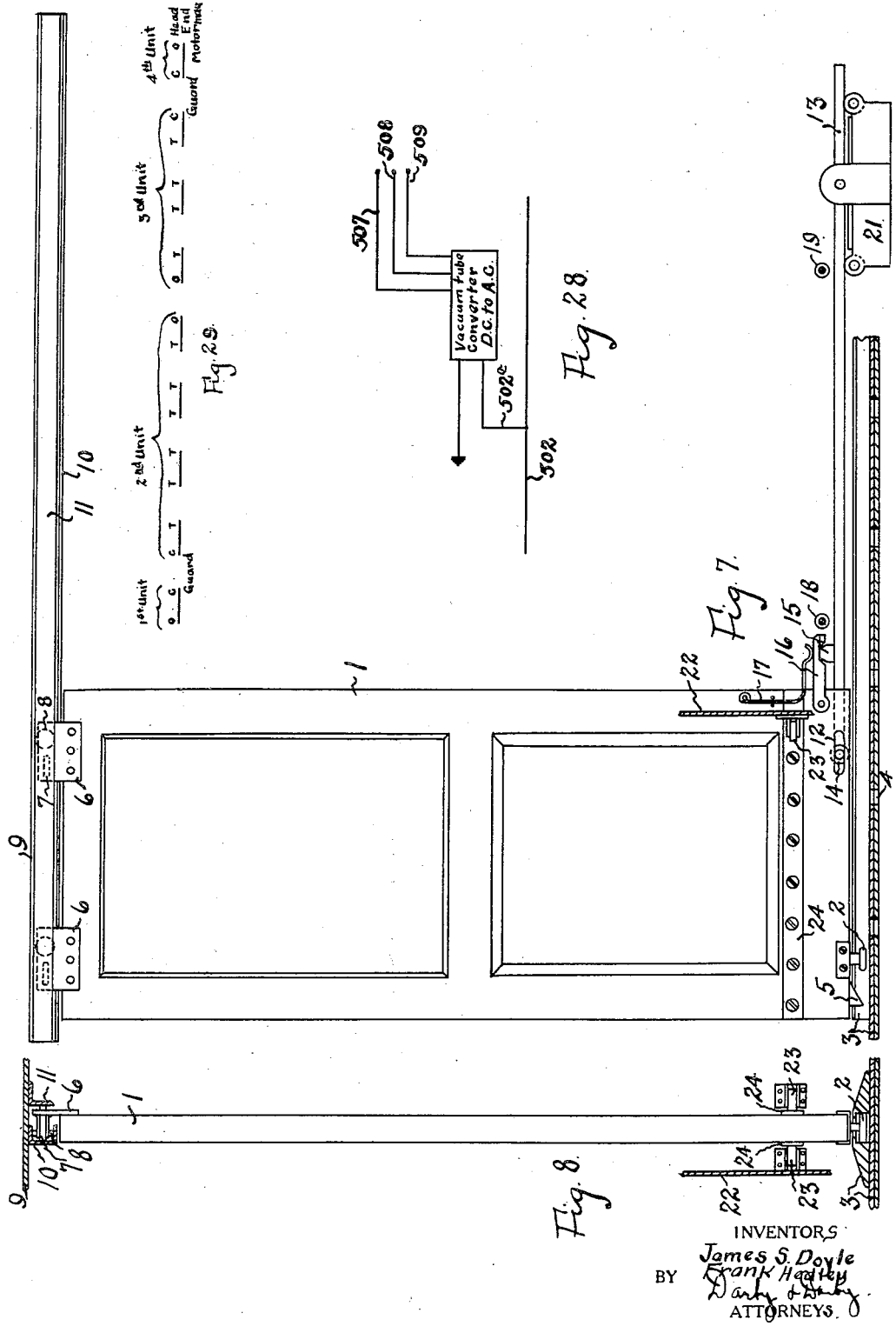

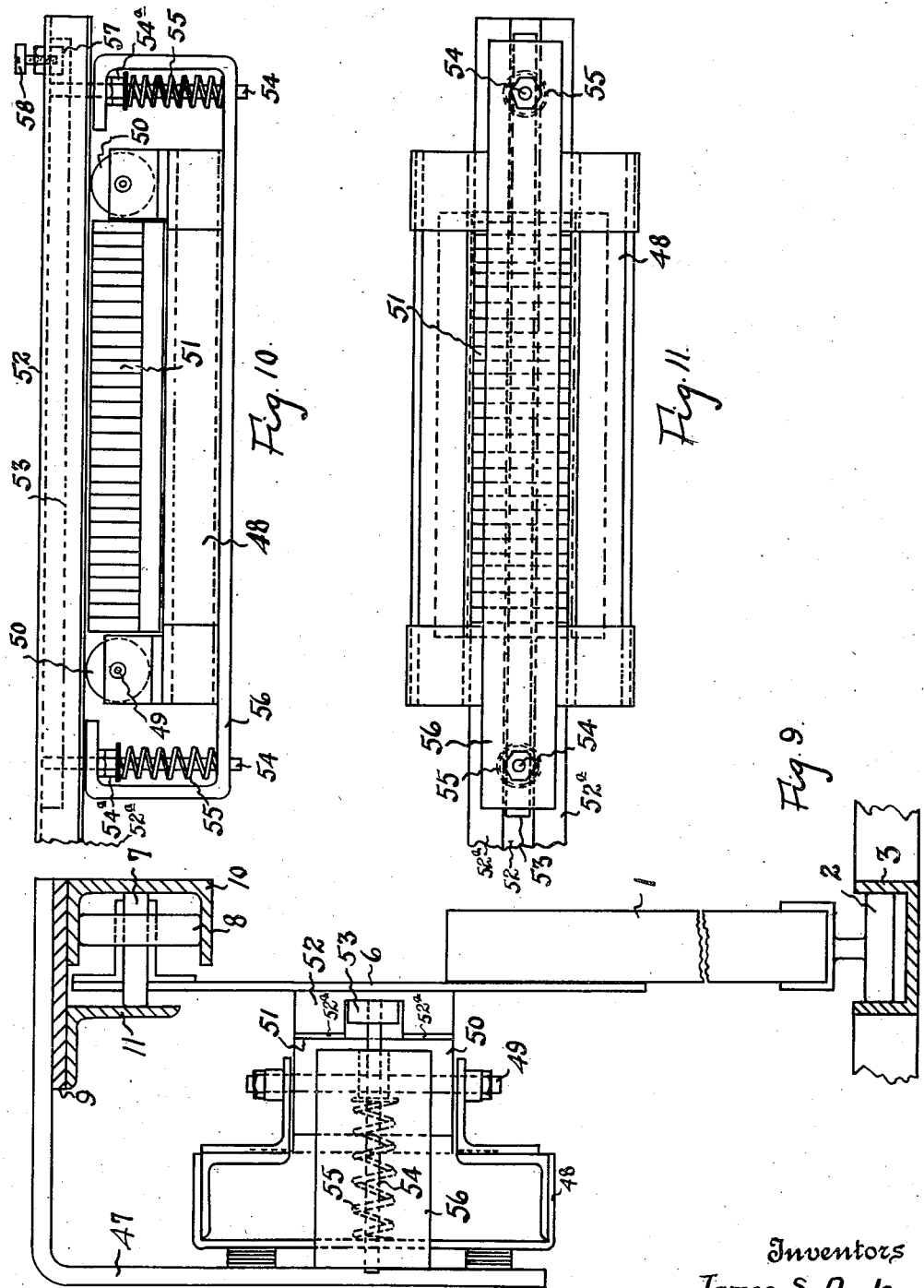

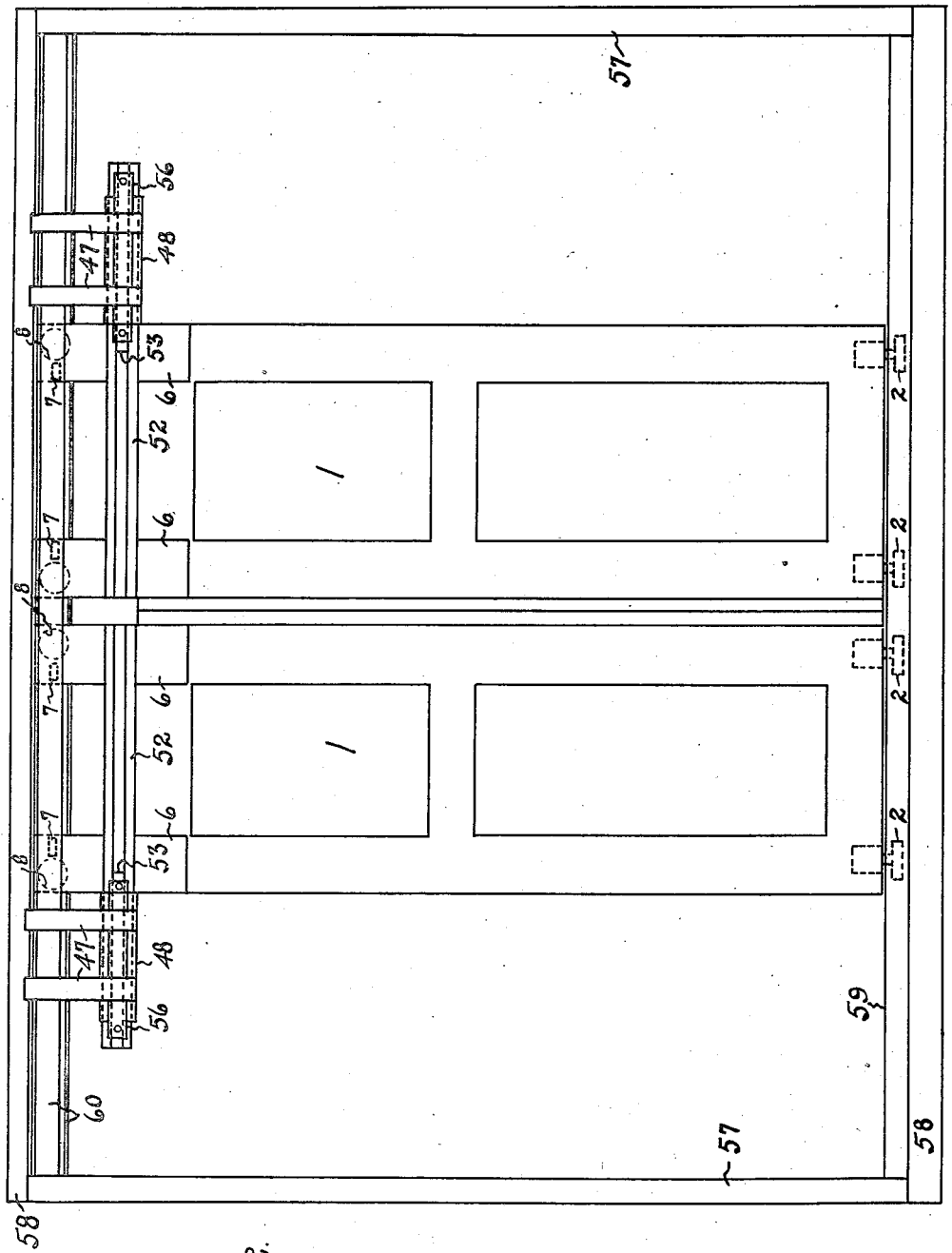

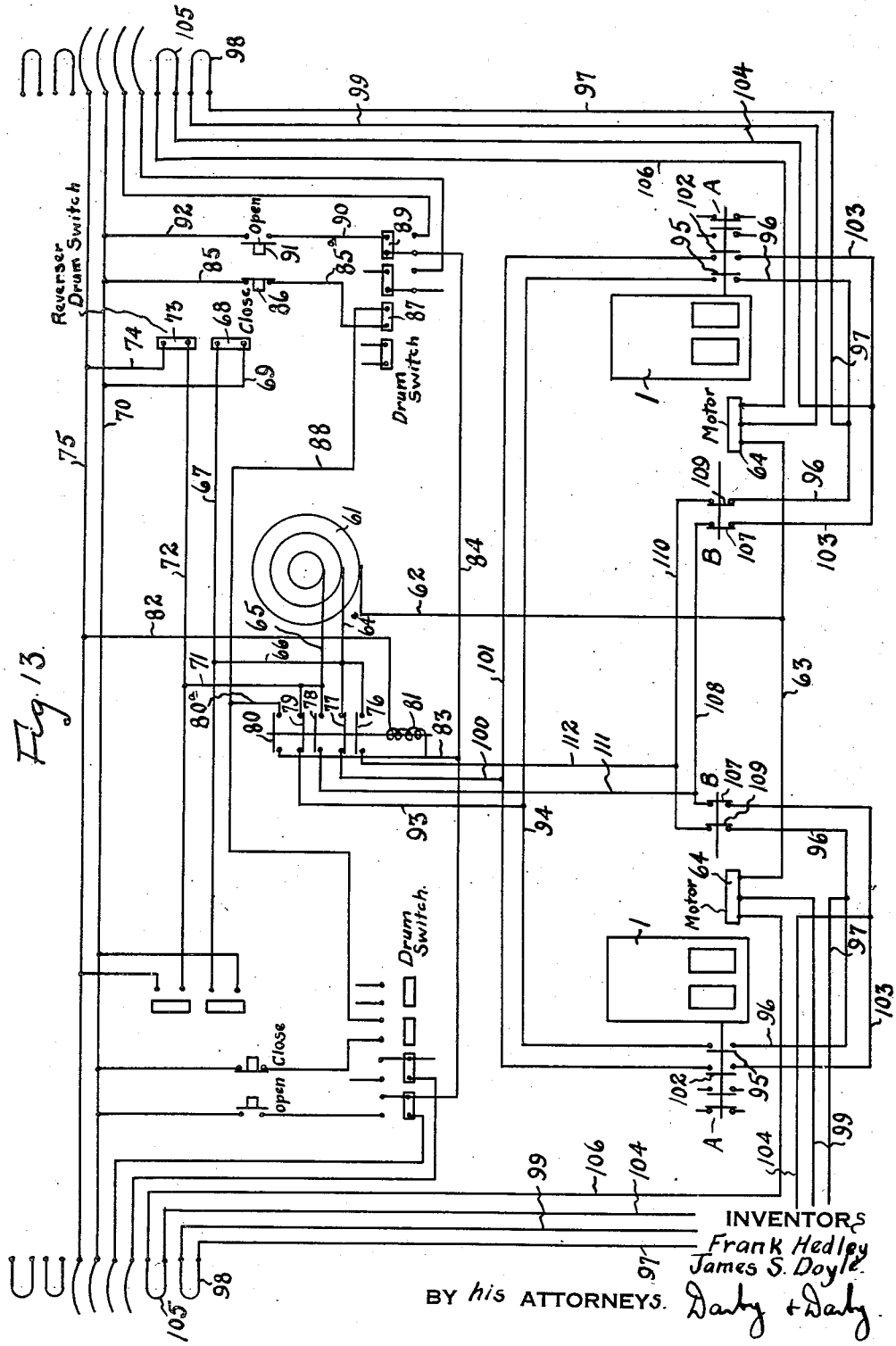

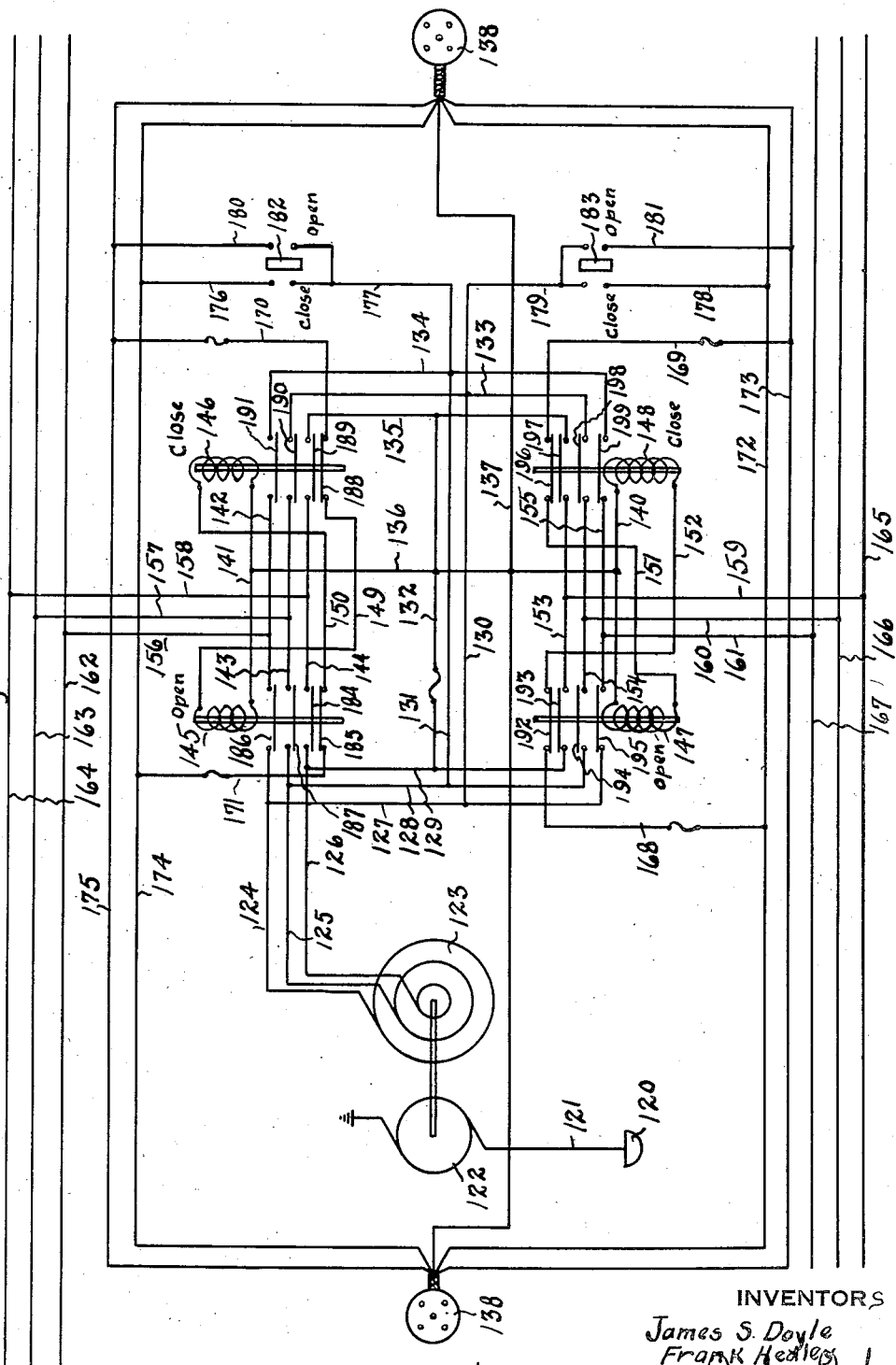

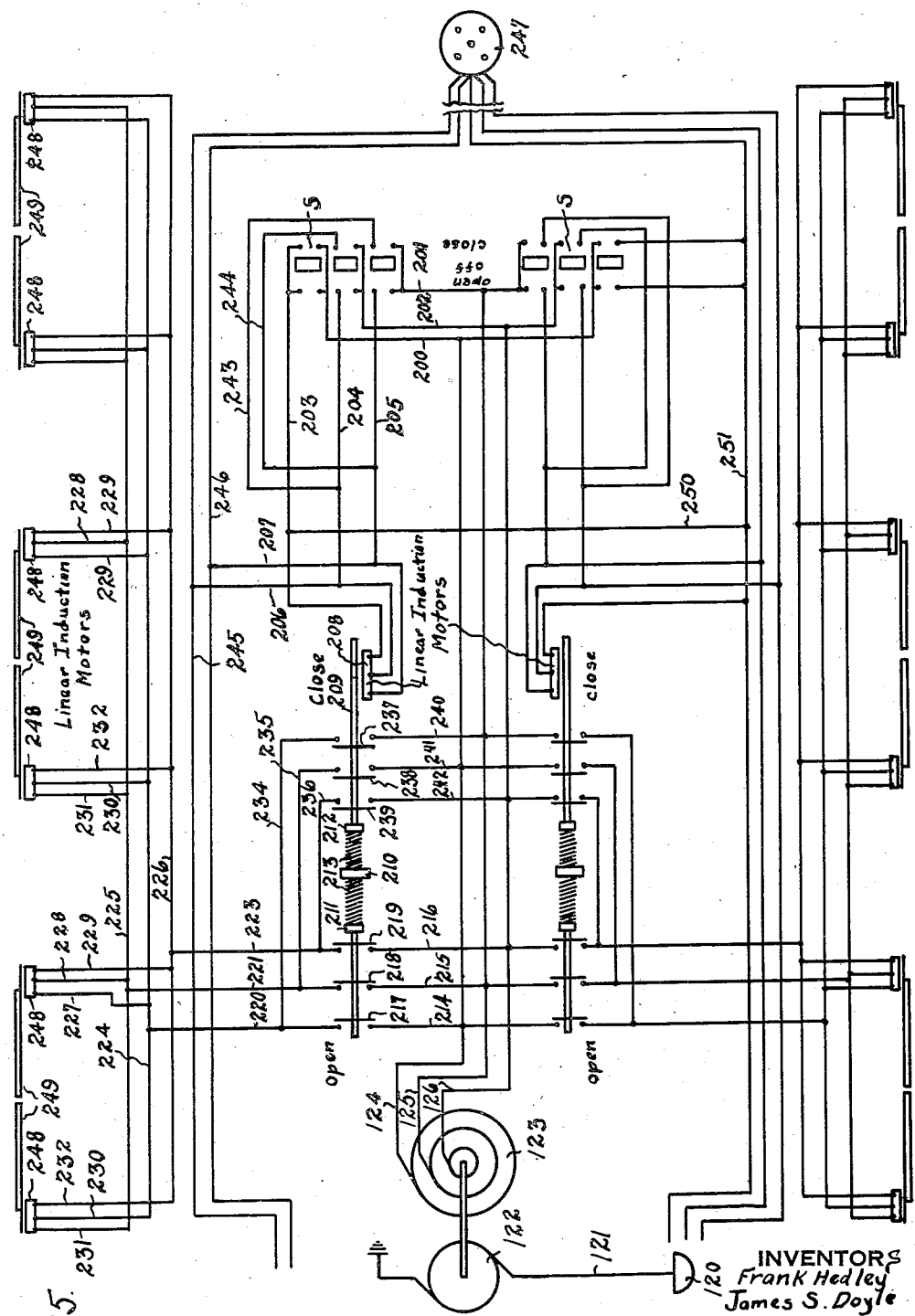

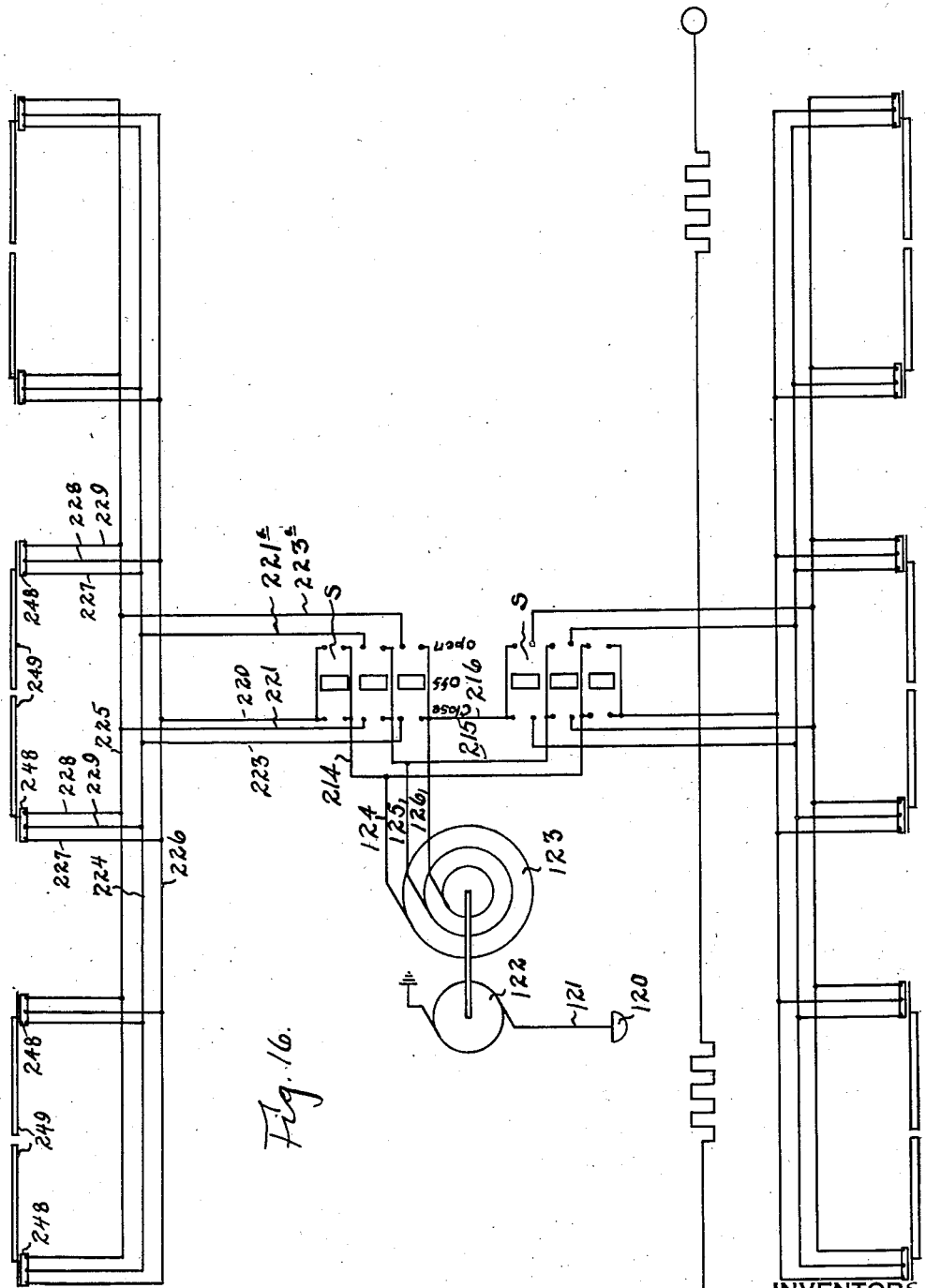

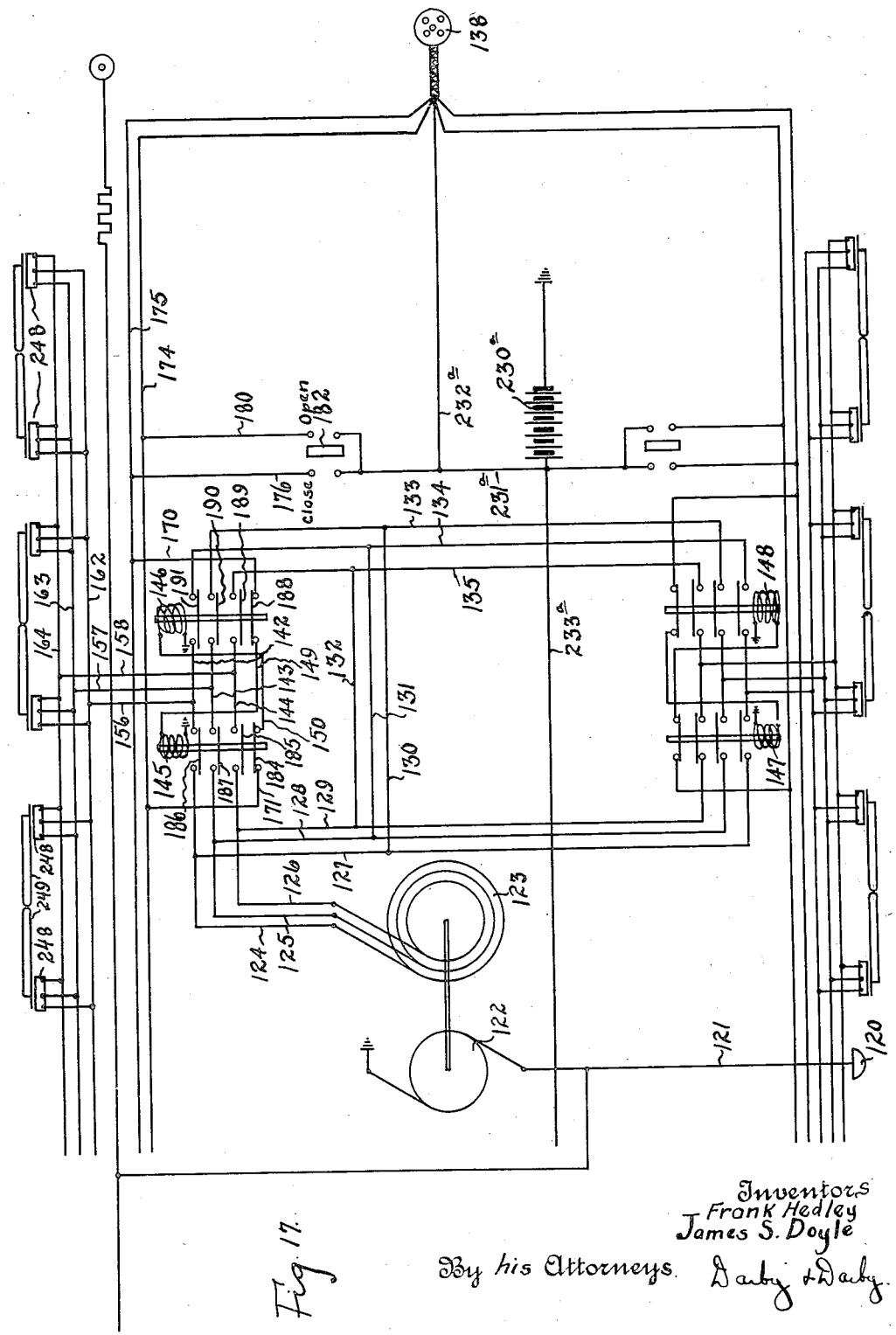

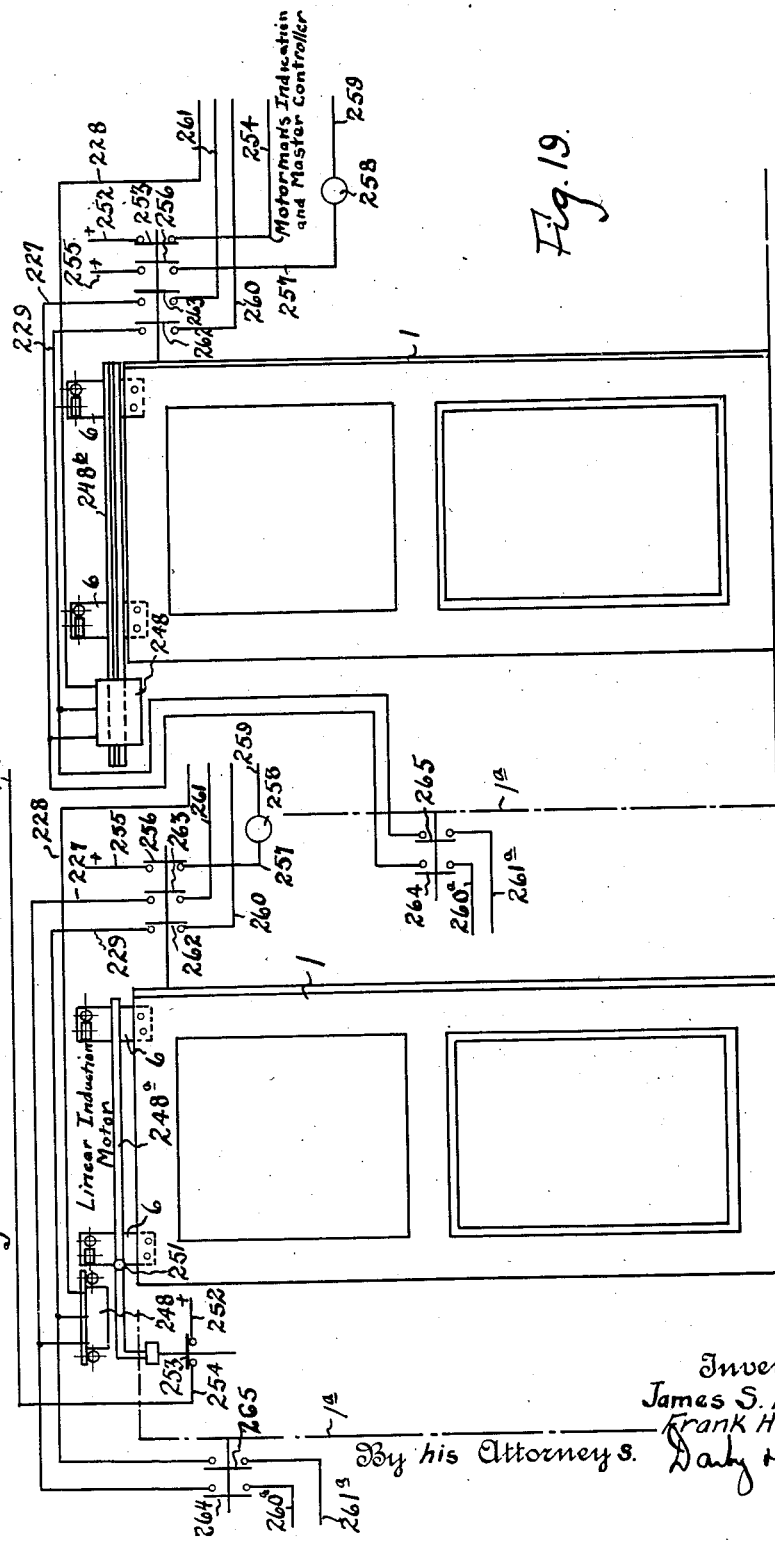

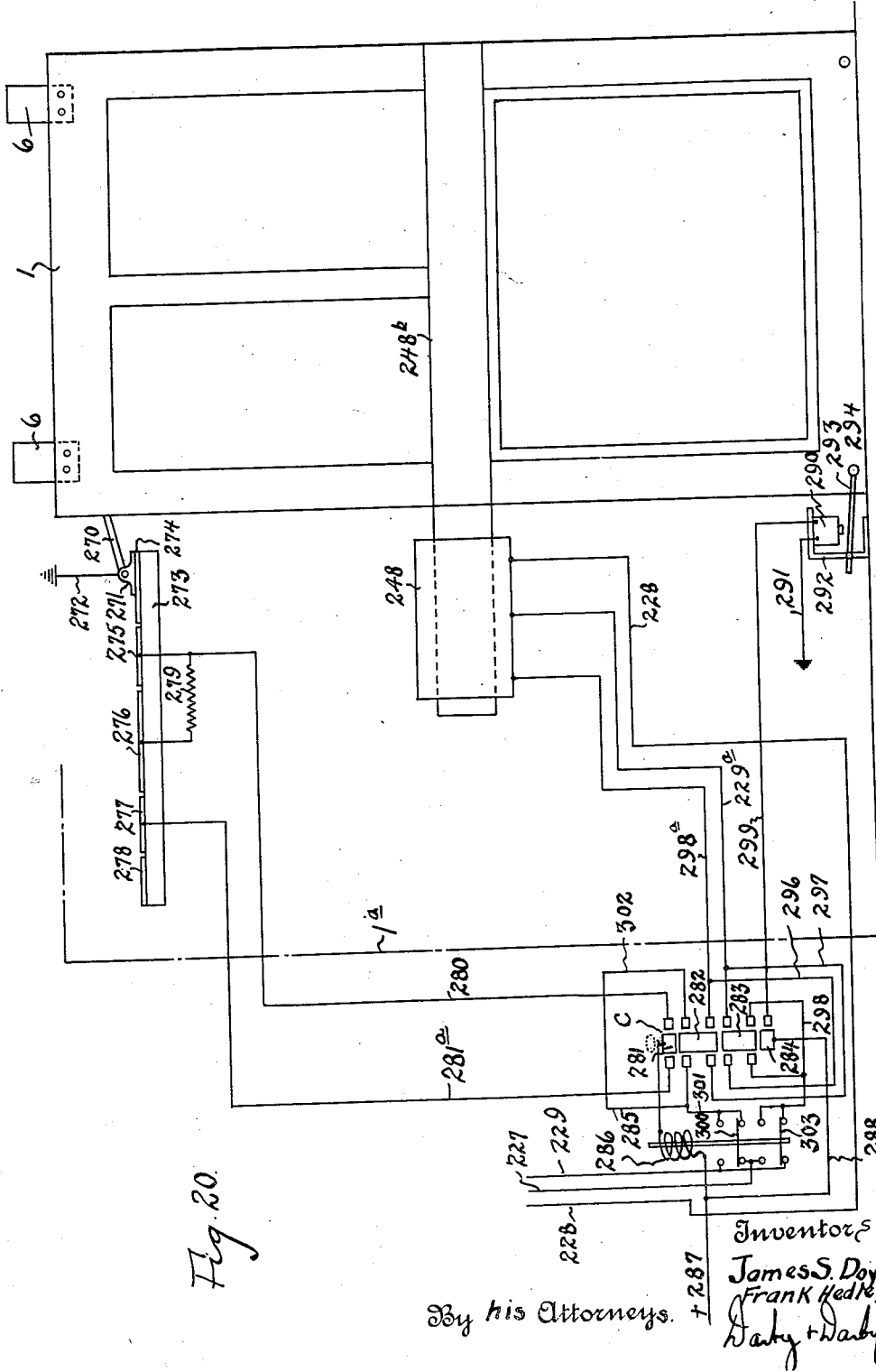

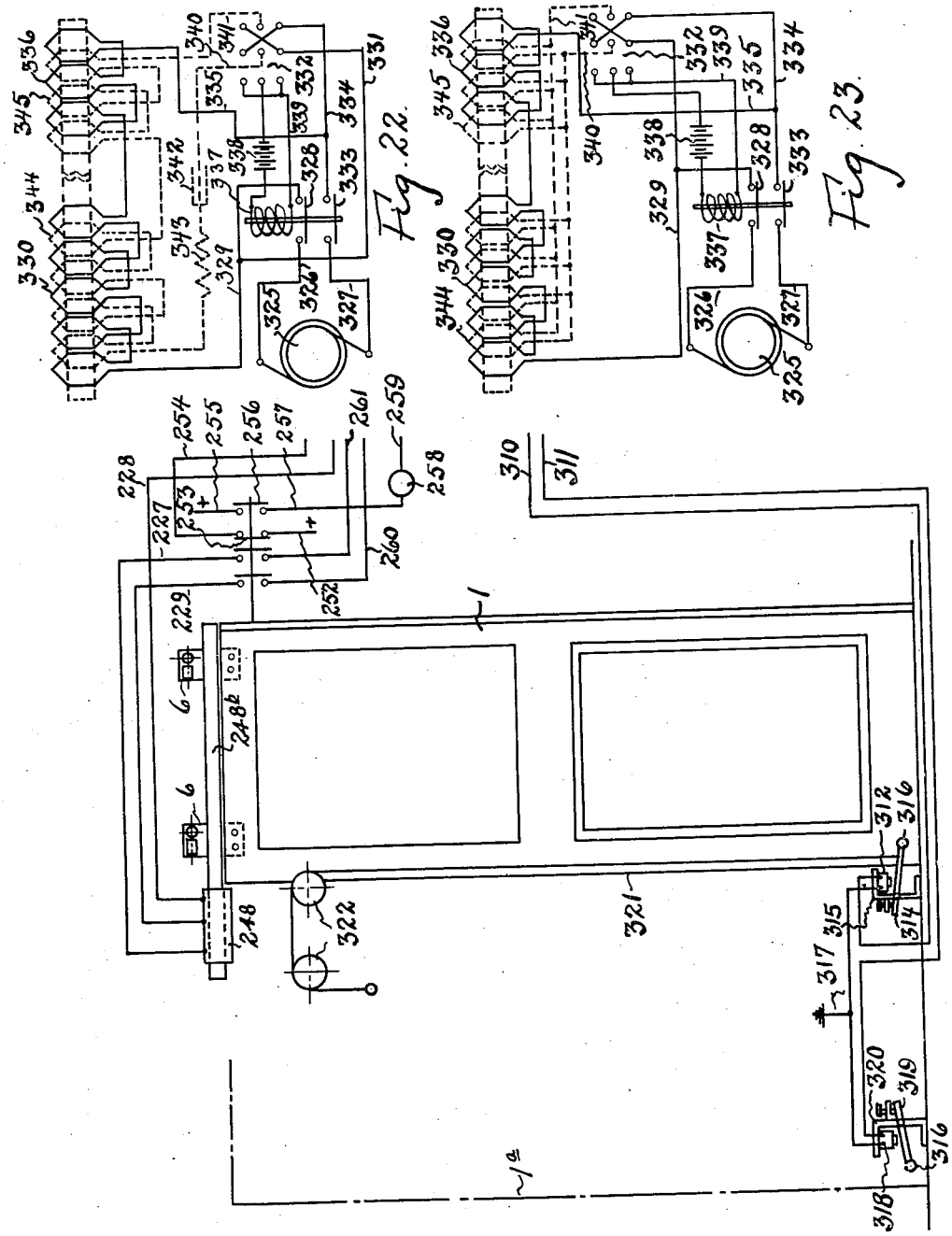

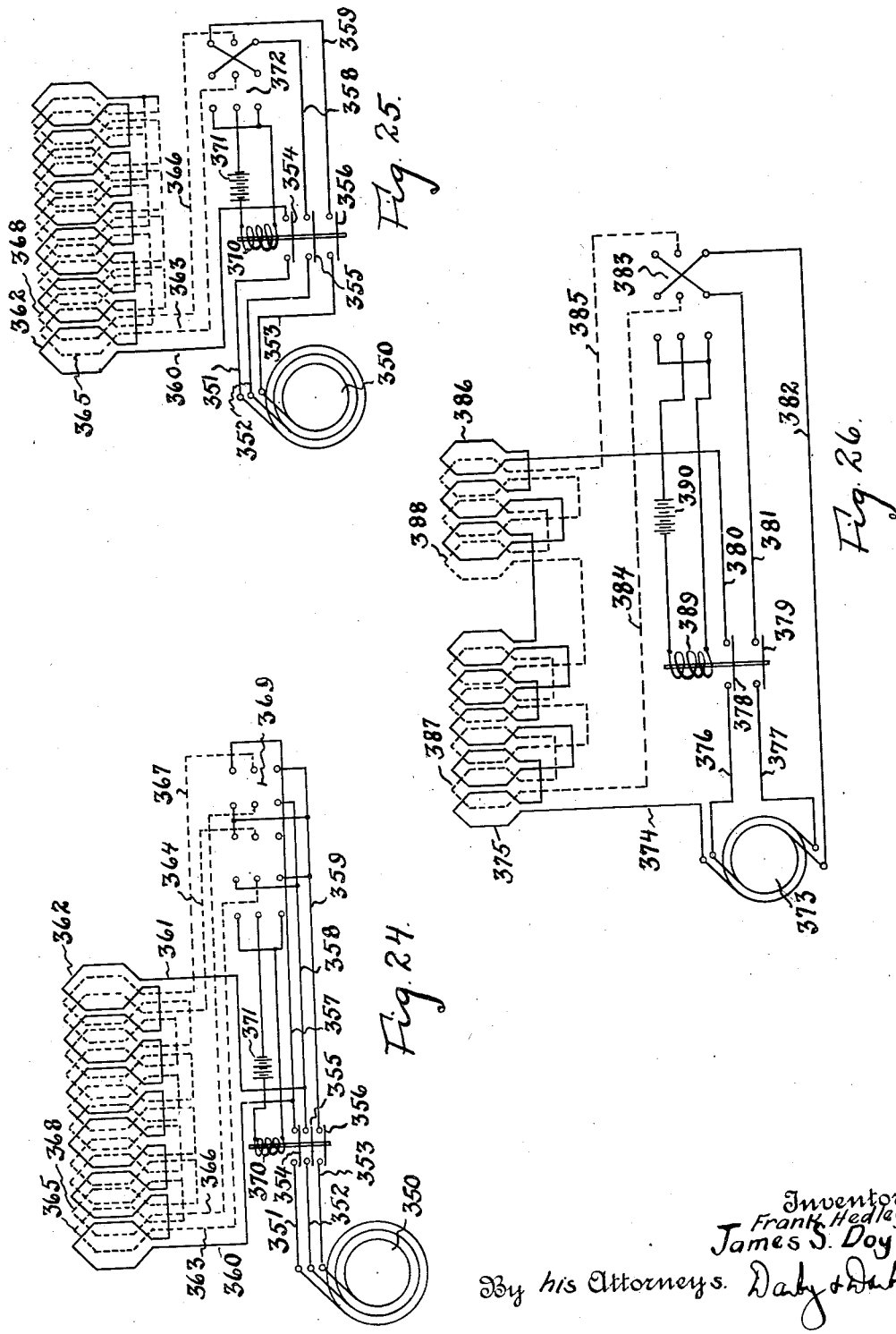

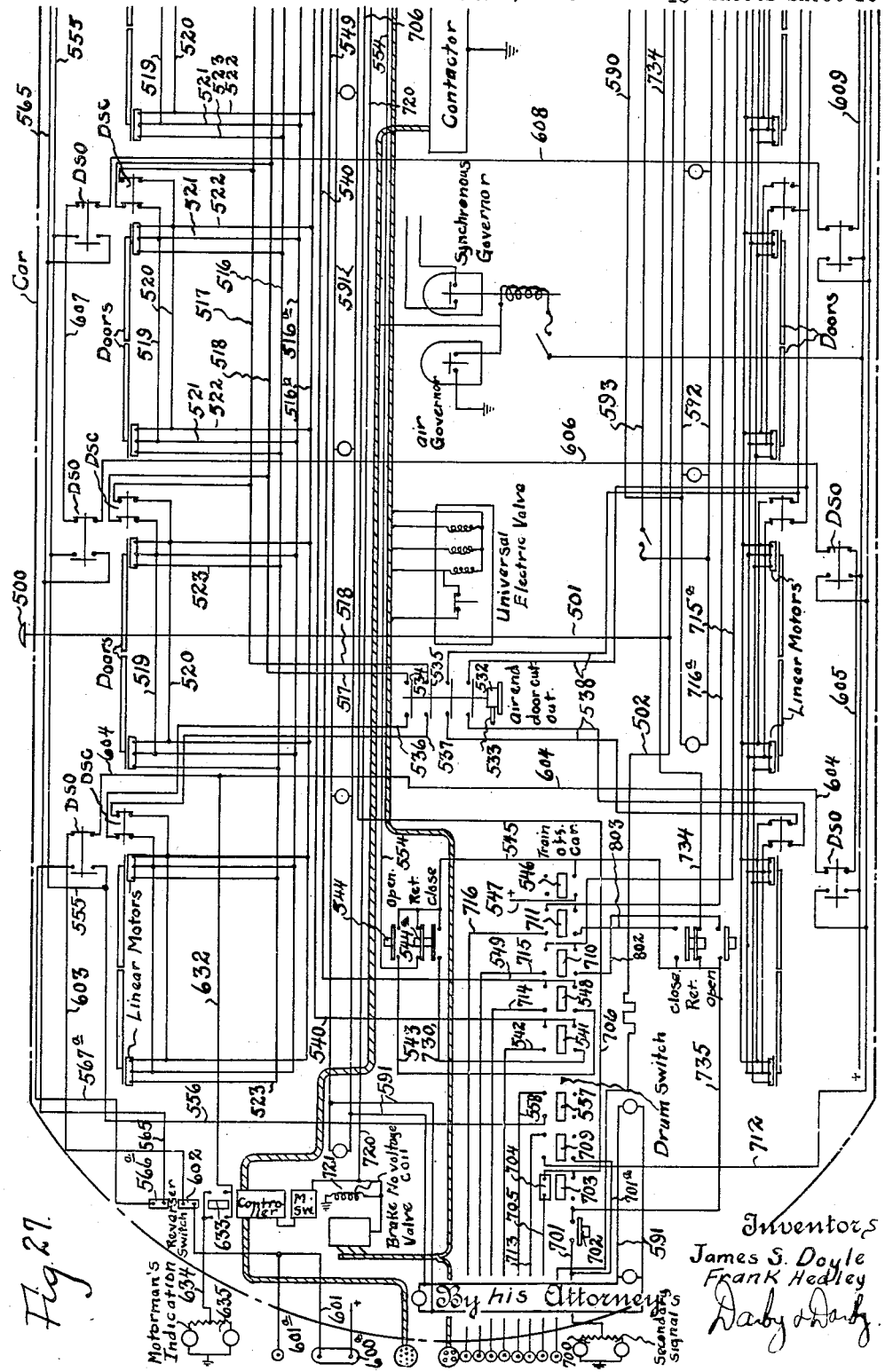

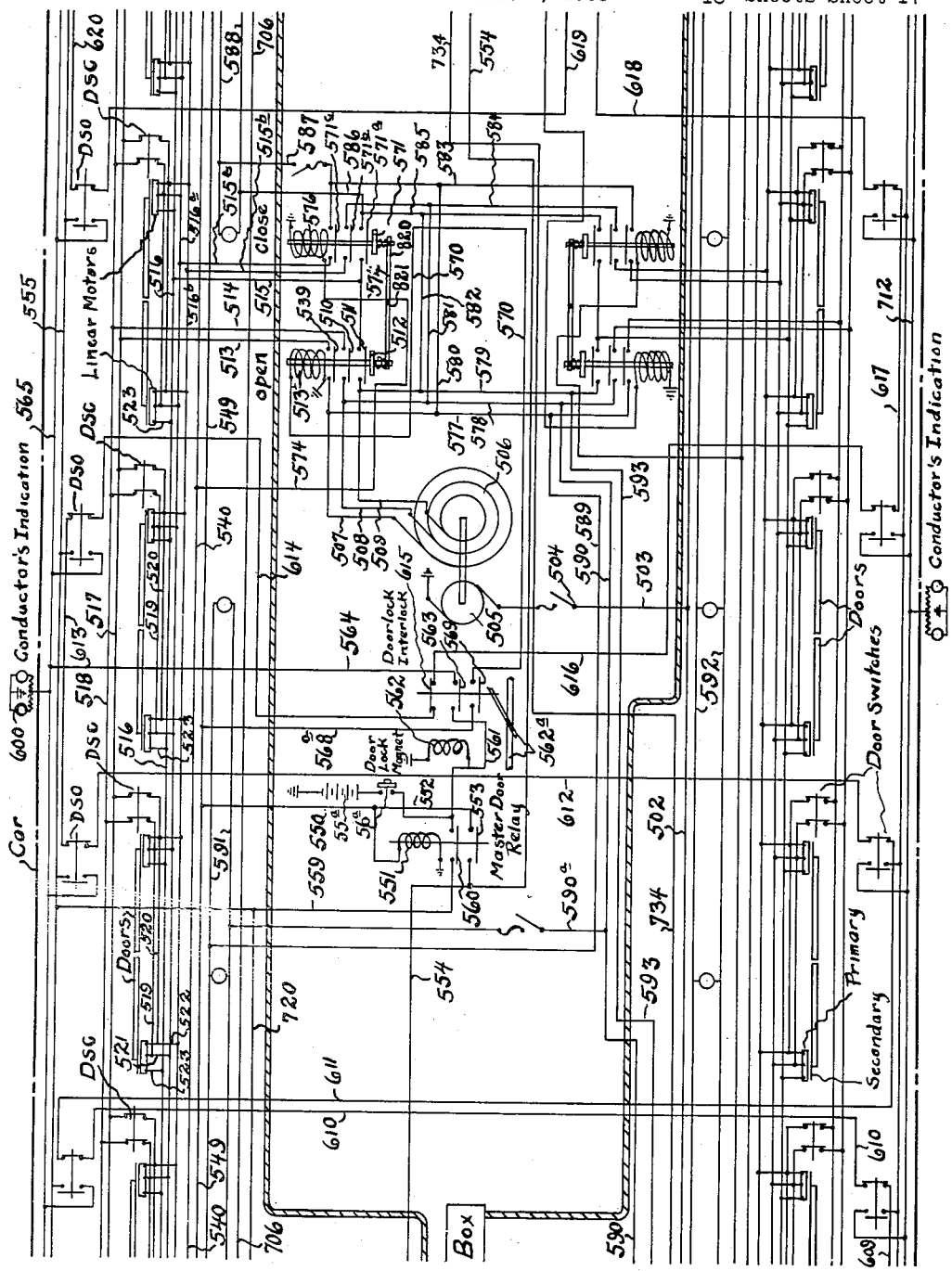

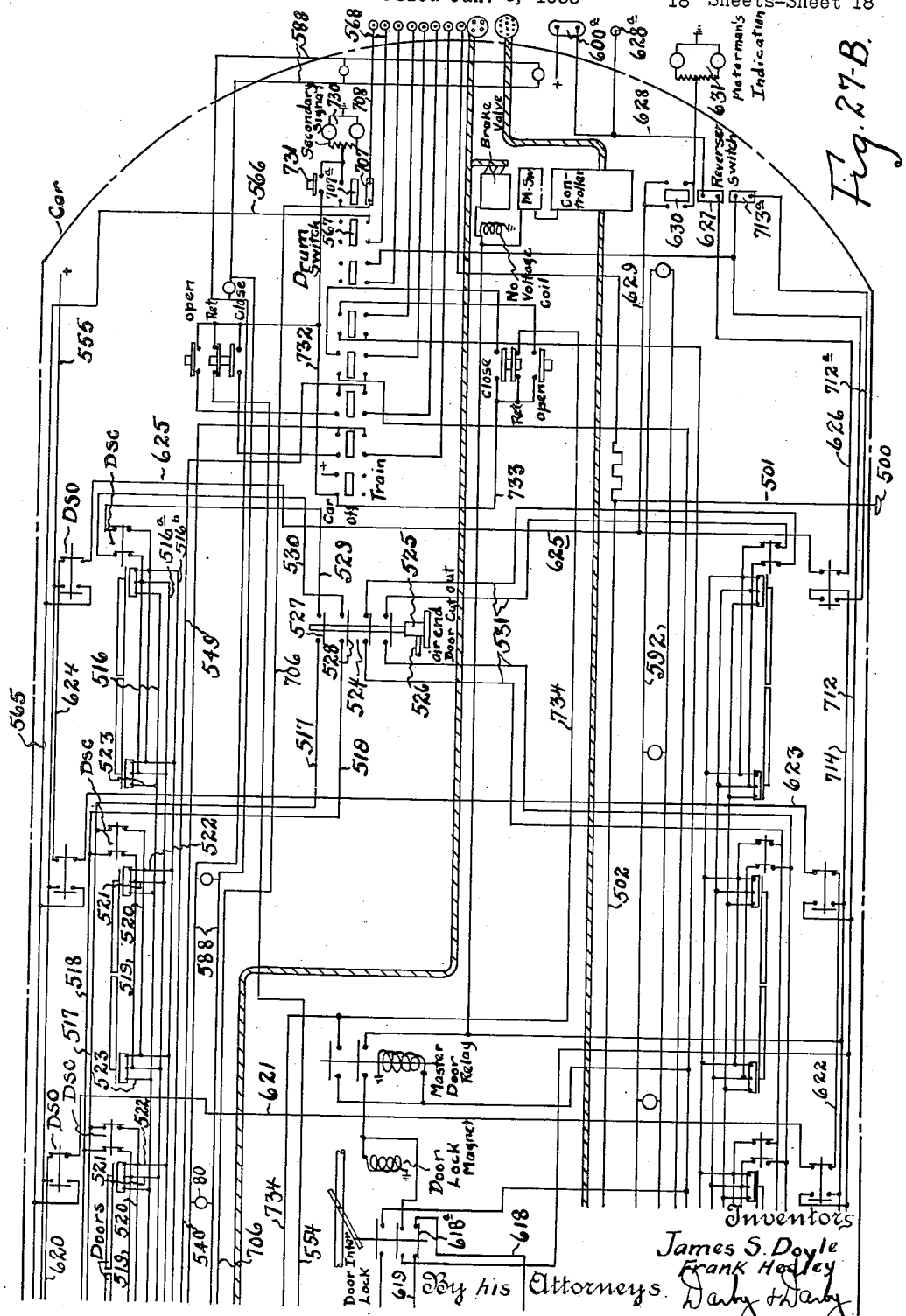

Patented Oct. 9, 1934

1,976,223

UNITED STATES PATENT OFFICE 1,976,223

VEHICLE AND VEHICLE DOOR OPERATING MECHANISM

Frank Hedley, Yonkers, and James S. Doyle, Mount Vernon, N. Y.

Application January 3, 1933, Serial No. 649,926

7 Claims. (Cl. 20—19)

This invention relates in general to improvements in vehicles, especially with respect to the form, construction and arrangement of the various auxiliary mechanism thereon.

A general object of this invention involves the employment of a number of doors on each side of a vehicle, in order to expedite the loading and unloading of passengers at stations, with the result that the time at which a train is at a station is reduced so that more trains may be operated per hour over a given trackage.

Another object of this invention involves improvements in the door construction to produce light weight doors supported in all directions on anti-friction bearings so as to require a minimum of power to operate them.

Another object of this invention is the provision of linear induction motors for operating the doors.

Another object of this invention is the provision of simplified and improved control mechanism for these door operating linear motors.

Another object of this invention is the provision, in combination with light weight doors, of linear electric motors for operating them so that the usual reversing mechanism employed on the heavier weight doors now in use may be eliminated.

A further object of this invention is the provision of mechanism in connection with the doors and motors for braking the doors at the end of their stroke and locking them in opened or closed position.

Another object of this invention is to eliminate the air equipment now used on transportation vehicles for operating the doors and to reduce considerably the size of the storage batteries required in present practice.

Another object of this invention is the provision of a complete alternating current control system on each car for the door operating mechanism, the signalling mechanism, the lights, and the other equipment.

A still further object of this invention is the provision of a self-contained light weight door frame and doors supported on the frame with antifriction bearings.

The further object of employing linear electric motors so associated with the doors that, when the motors are energized for closing operation, the doors are always tending to close is attained by means of this invention.

These and many other objects, as will appear from the following detailed disclosure, are secured by means of this invention.

This invention resides substantially in the combination, construction, arrangement, relative location of parts, and circuital connections, all as will be described in greater detail hereinafter.

Referring to the drawings:

Figure 1 is a side elevational view with some parts in cross-section of one form of door and linear induction motor;

Fig. 2 is a vertical cross-sectional view through the door and its guiding tracks;

Fig. 3 is a side elevational view of a modified arrangement of the door and motor;

Fig. 4 is a cross-sectional view through the motor which is shown mounted below the floor of the vehicle;

Fig. 5 is a modified mechanism for operating a door by a linear induction motor;

Fig. 6 is a side elevational view with some parts broken away of one form of linear induction motor;

Fig. 7 is still another form of door and motor for operating it;

Fig. 8 is an end elevational view of mechanism of Fig. 7 with some parts in cross-section;

Fig. 9 is an enlarged end elevational view with some parts in cross-section of a door and linear induction motor with a brake and locking mechanism;

Fig. 10 is a top plan view of the motor and its mounting;

Fig. 11 is a side elevational view of this motor;

Fig. 12 is a side elevational view of a door frame, doors mounted thereon and linear induction motors for operating the doors, all made as a unit;

Fig. 13 is a simplified circuit diagram for the motors for operating the doors and the control circuits therefor;

Fig. 14 is a modified control circuit;

Fig. 15 shows a still further modified form of circuit;

Fig. 16 shows another form of control circuit;

Fig. 17 shows still another form of door control circuit;

Fig. 18 is a side elevational view of a door and linear induction motor including some of the control circuits;

Fig. 19 is a modified arrangement of door, motor and circuits;

Fig. 20 is another form of control circuit for the motor showing locking means to lock the door in closed position;

Fig. 21 shows a still further modified form of motor circuit including locking means for the door for holding it locked in open or closed position;

Fig. 22 shows the connections for a single phase linear induction motor including a starting winding employing a resistance and condenser;

Fig. 23 is a similar circuit arrangement in which the condenser and resistance are not employed;

Fig. 24 represents the circuit connection for a three-phase linear induction motor with the windings connected in delta;

Fig. 25 is a diagrammatic illustration of a three-phase Y connection;

Fig. 26 is a diagrammatic illustration of the connections for a two-phase linear induction motor;

Figs. 27, 27-A and 27-B taken together comprise a circuit diagram of the connections for a car showing the invention as applied thereto. In this form the third rail direct current is transformed to polyphase alternating current by means of a rotary converter;

Fig. 28 is a diagrammatic view of a vacuum tube D. C. to A. C. converter which may be connected into the circuits of Fig. 27-A in place of the rotary converter;

Fig. 29 illustrates diagrammatically the position of the drum switches for a nine car train divided into four units.

The invention of this case is described in connection with a transportation vehicle, such as a subway car, but it is, of course, apparent that the principles of the invention may be applied to any form of vehicle. The prime object of the invention when applied to modern subway transportation systems is to speed up the operation of the trains and to permit of the reduction in headway between trains. The expense of laying additional tracks in modern subway systems is tremendous, so that it is desirable to increase the capacity of the trackage, consistent with safety, as much as possible, particularly during rush hours.

The capacity of the trackage may be increased by reducing the time which a train must be held in a station during the loading and unloading of passengers. Present subway vehicles usually have three doors on each side of each car. This limited number of doors delays the loading and unloading of passengers.

One way to increase the rate of loading and unloading of passengers is to increase the number of doorways on each side of the vehicle. As the number of doorways and, hence, the number of doors for them is increased, the door operating mechanism and control apparatus must likewise be increased, with the result that the dead weight of the car increases rapidly. The ultimate limit to the number of doorways is, of course, controlled by the length of the cars. With average length cars such as now employed, the maximum number of doorways is of the order of ten on a side. Obviously, with ten doors on each side of the car, the weight of door operating equipment and control apparatus, especially if pneumatic motors are used, is increased prohibitively.

As it is highly desirable to have as many doors on each side of a car as is possible, it is an object of this invention to provide a different form of mechanism for operating the doors. It is an object of this invention to employ linear induction motors for operating the doors. Such motors are exceedingly compact, light in weight and simple in structure and require less and lighter operating and control equipment. Since it is necessary to operate such motors with alternating current and preferably polyphase alternating current it is necessary, of course, to have a source of current to energize the control and operating circuits. With alternating current of moderate voltage available on each car, it is also an object of this invention to employ parallel lighting circuits for the cars as distinguished from the series of direct current lighting circuits which are now used. Here, again, an advantage is gained because the burning out of one light does not affect any of the other lights in the circuits.

Another advantage of employing alternating current throughout the car for operating all the apparatus thereon is that the heavy auxiliary storage batteries, which are normally provided at the present time on each car, may be materially reduced in size in view of the reduced requirements of them, again effecting a reduction in dead weight of the car.

Another object of the invention is to construct the car and doors of light weight aluminum alloys. The doors being of an exceedingly light weight it is possible to eliminate the present reversing mechanism now used on the heavier doors, further effecting a reduction in the dead weight of the car.

The feature of the light weight door is further attained by mounting the primary of the linear induction motor adjacent the door and mounting the lighter secondary on the door itself. This has the further important advantage of eliminating moving contacts or flexible connecting cables.

Another advantage gained by the elimination of the door reversing mechanism is a reduction in the time which a train must remain in the station.

It is a modern practice to interconnect the controls for the driving motor circuits with the door motor operating circuits, so that the motorman cannot start the train until all the doors are closed and locked. By eliminating the door reversing mechanism, the time lost in having the doors reverse their movement and open fully before again closing, when striking an obstruction, is eliminated. This is possible with this invention, because the doors are made of exceedingly light material so that they will not injure a passenger should they strike him in closing. The doors are of such light weight and are so mounted that they may be pushed back by the person struck by them so that he may easily extricate himself. Linear induction motors are of such a construction and associated with the doors in such a way that when they are energized for closing, they are always tending to close the door so that as soon as the door is freed, after striking a person, they immediately begin to close. Since the only connection between the door and the motor is a magnetic field, these operations are possible.

A major object of this invention is to provide a unitary door structure comprising a frame in which the light weight doors are mounted on antifriction bearings so that it may be installed on a car as a unit. This insures that the frame may be constructed with the necessary accuracy so that the door may move with a minimum amount of resistance. This feature is of particular importance in connection with linear motors of either the D. C. or A. C. type for operation of the doors, because the door offering a minimum of resistance to movement may be operated by an exceedingly small and compact linear induction motor.

Indeed, it would be impossible to use a linear induction motor for operating car doors of the usual construction which are very heavy and offer considerable resistance to movement. Hence, the use of a light weight door unit, as disclosed in this invention, makes it practical or feasible to operate the door with such a motor. The unit may then consist not only of the frame door and its anti-friction supports, but may also include as a part of that unit a linear induction motor and a locking device. It is, of course, understood that the unit is not limited to use with a linear induction motor, since any suitable form of motor device, such as a fluid pressure engine, could be used. An advantage of the unit is that no matter what form of the engine is used, it may be reduced to an exceedingly small compact device, because of the lightness of the door and the ease with which it may be operated.

To summarize, it is apparent that by using linear induction motors for operating the doors of vehicles, it is possible to attain the prime object of increasing the number of trains per hour which may be run over a given trackage. The use of this motor simplifies the operating and control circuits, materially reduces the weight of the vehicle, which represents economy in operation and permits the modification of the operating motors and circuits for the vehicle, as well as the auxiliary operating and control circuits with the elimination of some of the auxiliary equipments now necessary with present day constructions.

Reference will now be made in detail to the various elements and their structure which comprise the invention by means of which the many objects discussed and the many other objects, which will become apparent as the description proceeds, are attained.

Referring to Figs. 1 and 2, the light weight door is shown at 1. The door may be constructed of any light weight material, but is preferably made of light aluminum alloys in the form of a shell as shown in Fig. 1. This door is provided at suitable points at its bottom edge with antifriction rollers 2 which are mounted thereon by suitable brackets. These rollers move in guide tracks 3 which are provided with holes 4, through which the dirt which collects in the tracks may fall. The forward edge of the door is provided with a projecting rib or scraper 5, which keeps the track clean and helps to move the dirt to a point where it will fall through the holes 4. Secured to the top of the door in any suitable manner are the hanger plates 6 on which are mounted antifriction rollers 7 and 8. These antifriction rollers are mounted with their axes at right angles to each other, so that pressure on the door in any direction will be absorbed by the antifriction rollers. With this construction it will be seen that the doors are supported so that pressure on the doors from any direction will not tend to bind the door and prevent its free movement.

At 9 is shown any suitable part of the vehicle, to which the U-shaped track 10 is secured, on which the rollers 8 move. A suitable angle plate 11 is secured in relation to the track 10 to provide with it a bearing surface for the rollers 7. At 12 is shown a longitudinal slot in the door in which the pin 14 secured to the rod 13 may move. The pin 14, if desired, may likewise be provided with an antifriction roller. The rod 13 is provided with an integral lug 15 which cooperates with a latch member 16 pivotally supported on the door. A flat spring 17 secured to the door presses down on the latch 16 to hold it in the position shown in engagement with the lug 15. Mounted on any suitable support, such as a part of the car frame, is a stop 18 which is in the path of movement of the latch 16 and is in such a position as to engage the latch when the door is fully closed, as shown in Fig. 1. Spaced therefrom is a similar stop 19 which likewise is in the path of movement of the latch 16 to lock the door in open position. The lug 16ª forming part of the latch engages the stop 19 when the door is fully open to hold it in locked position. At 20 is a resilient buffer mounted on the car in a suitable position to be struck by the door as it reaches its full open position. At 21 is diagrammatically shown a linear induction motor which is suitably mounted on the car in such a position that the bar 13, which is made preferably of a magnetic material but not necessarily so, comprises the secondary of the motor. The air gap between the primary core of the motor and the secondary bar 13 is maintained by means of antifriction rollers 21ª forming part of the motor frame.

The mechanism is shown with the door closed and locked. When the primary of the motor is energized by means of a polyphase alternating current the resultant travelling field draws the bar 13 to the right. This bar may move for a limited distance before the door begins to move by reason of the pin and slot connection which is provided. As soon as lug 15 engages the incline surfaces of latch 16, it is moved upwardly against the reaction of spring 17, out of the path of stop 18, thereby unlocking the door. Further movement of the bar to the right causes pin 14 to engage the end of slot 12, causing the door to open fully until stopped by the buffer 20. The motor 21 will be deenergized when the door is fully open by means of the mechanism to be described later. As soon as the motor is deenergized so that there is no pull on bar 13, spring 17 will force the latch down to a point where the lug 16ª thereof engages the stop 19 to lock the door in open position. To close the door the motor 21 is energized in reversed direction, so that bar 13 is urged towards the left. The first movement thereof will cause lug 15 to move latch 16 out of engagement with the stop 19, and further movement thereof will move the door to closed position. As soon as the door is fully closed and motor 21 is deenergized, latch 16 will be moved to locking position by engagement with stop 18.

A modified form of door and motor arrangement is shown in Figs. 3 and 4. The door is supported at the top as previously described. Near the bottom of the door on each side are provided metal strips 24. Suitably supported on the car frame, for example, are antifraction rollers 23 on each side of the door which engage strips 24 to absorb side thrusts on the door. The floor of the vehicle is shown at 25 and is provided with a longitudinal slot below the lower edge of the door. Secured to the bottom of the door at suitable points are plates 26 having the depending arms 27, on which are mounted antifriction rollers 28. Secured to the depending arms 27 is a secondary 29 of the linear induction motor. At this point it may be well to state that the secondary of the linear induction motor may be made of either magnetic or non-magnetic material and may be made in the form of a solid bar, or may be constructed of laminæ. The secondary may or may not be provided with short circuited windings to form a squirrel cage. The bar can, for example, be made of aluminum in which sufficient eddy currents may be set up by the travelling field of the primary to effect movement thereof. The details of construction are shown in Fig. 4. Below the floor 25 is a channel iron 31 which is provided with a supporting bracket 34 for the primary 30 of the linear induction motor. Guides for the antifriction rollers 28 are provided by the bar 32 and the angle plate 33.

A modified arrangement of doors and motor is shown in Fig. 5, in which the door 1 has secured to its rear edge by means of brackets a vertical rod 35. The linear induction motor is shown diagrammatically at 36, and in this case the secondary is made in the form of a toothed bar or gear rack 37. Rotatably mounted on a suitable shaft 39 is a segmental gear which meshes with the rack 37. This gear is provided with an arm 40 to the outer end of which is pivotally secured a collar 41 which is slidably mounted on the vertical bar 35. When motor 36 is energized to draw bar 37 to the left, the gear and arm are rotated in a clockwise direction to effect the opening of the door. When the motor is reversely energized the door is closed.

A form of linear induction motor is shown in Fig. 6. It comprises a casing 42 provided at each end with integral parallel arms 43 which are slotted as at 44. Antifriction rollers 45 are mounted between these arms with their spindles in these slots. The primary of the motor is shown as made up of a core $42^a$ which is preferably laminated. Within slots in the core are the primary windings $42^b$. The entire primary structure is pivotally mounted at 52' adjacent the door so that it may assume the correct operating position as the door moves, so that the rollers 45 will continuously engage the secondary bar 46. The secondary of the motors is shown in the form of a bar at 46. This bar 46 contacts with the rollers 45 which are proportioned so as to maintain as small an air gap as is possible between the bar and the primary core $42^a$. With this arrangement frictional resistance to the movement of the bar 46 is materially reduced.

A still further modified combination of door and motor is shown in Figs. 7 and 8. The door 1 is supported as before at the top. As described in connection with Figs. 3 and 4, the side thrust of the door is absorbed by means of the antifriction rollers 23. In this form of the invention the lower edge of the door is provided with one or more antifriction rollers 2 moving in the track forming members 3. In this case, however, the motor is connected to the bottom edge of the door. The connecting and locking mechanism is similar to that shown in Fig. 1.

A modified combination of door and motor is shown in Figs. 9, 10 and 11 in which an automatic brake and lock are included. The door, as before, is shown at 1 and is provided at its bottom edge with one or more antifriction guide rollers 2 which operate in a floor track 3. The door is provided with the hanger plates 6 at its top and the horizontal and vertical guide rollers 7 and 8 operating between the channel and angle plates 10 and 11. Slidably mounted in casing 48 which is attached to the depending brackets 47 is the primary of the motor having a laminated core 51 within the windings placed in accordance with known practice. Slidably mounted in yoke 56, which is mounted on the brackets 47, are the rods 54 which are surrounded by coil springs 55 which lie between the yoke and the lock nuts $54^a$ secured to the rods 54. These rods are, in turn, secured to the braking bar 53. This braking bar lies within a longitudinal groove in the bar 52 which forms the secondary of the linear induction motor and which is secured to the hanger plates 6. The secondary bar 52 is preferably of magnetizable material face with conducting bars $52^a$ of aluminum, copper or the like. The secondary reaction currents are set up in the bars $52^a$ and are increased in magnitude by the presence of the magnetizable bar 52.

The induction motor core is provided near each end with spindles 49 on which the antifriction rollers 50 are mounted. These rollers contact with the bars $52^a$, especially when the motor is energized, to hold the secondary the proper distance from the wound primary core 51 to provide a minimum air gap. The braking and locking bar 53 is provided with a notch 57 near one end, within which projects the end of a thumb screw 58 which is locked to the bar 52. In the operation of this device, when the motor primary 51 is energized, bar 53 is drawn towards it, out of engagement with bar 52. This movement of bar 53 is effected by magnetic pull of the primary on the bar, causing pins 54 to slide in the yoke 56 and compress spring 55. This movement of bar 52 shifts it out of the path of the set screw 58. The travelling field of the motor then causes bar 52 to move longitudinally thereof, carrying with it the door and its connected parts. Near the end of the opening stroke the motor is deenergized, as will be described later, putting bar 53 under the control of springs 55 which press the bar into frictional engagement with the secondary bar 52, acting to retard the movement of the door near the end of its stroke and to firmly hold it in open position. Upon reversal of the motor to effect closing, bar 53 again releases bar 52 to permit the door to close. Near the end of the closing stroke the motor is again deenergized and bar 53 is released so as to retard the movement of the door at the end of the stroke. When the door is fully closed, set screw 58 effects locking of it in closed position. Springs 55 are always acting to cause engagement between bars 52 and 53 so as to hold the door firmly closed.

In Fig. 12 is shown a unitary door frame, doors and motors for operating them. This unit is of such a construction that it may be mounted complete as one structure directly into the car frame. The unit comprises vertical members 57 and horizontal members 58 united to form a rectangular frame of the proper size and form. Secured longitudinally thereof and at the bottom of the frame is the lower guidetrack 59 in which the rollers 2, attached to the lower edges of the door 1, travel. As in previously described constructions, the plates 60 secured along the upper edge of the frame provide a guide track for the rollers 7 and 8 which support the doors at their top by means of the hanger plates 6. In the arrangement in Fig. 12, a motor and braking device similar to that in Figs. 9 to 11 is employed. The secondary bars 52 are shown secured to the door hangers 6, and the motors are shown supported from the top of the frame by means of the depending brackets 47. This arrangement provides a relatively simple and light structure in which the door tracks, doors, motors and braking and locking devices are all constructed as a unit which may be fitted as a unit directly into the car framework.

Reference will now be made to some of the circuits which may be employed with apparatus of this type when used for operating vehicle doors.

In Fig. 13 is disclosed a simplified wiring diagram for two doors of a single car employing linear induction motors of the type previously described. The doors are shown at 1 and the motors are shown at 64 in the form of small rectangles. Since in modern transportation systems it is usual to supply direct current from the third rail, it is within this invention to employ rotary converters for changing this direct current to alternating current on each car. The motor for driving the polyphase generator has not been shown in this figure, although a diagrammatic representation of the motor-generator unit will be found in other figures—in Fig. 14, for example. The polyphase generator is indicated diagrammatically at 61. One of the brushes thereof is connected by wire 62 to a common fixed connection 63, extending to each motor 64. The next brush is connected by wire 64a to two of the contacts of an electro-magnetically operated relay and by wire 66 to wire 67. The third brush of the generator is connected by wire 65 to two of the contacts of the relay and, in turn, by wire 71 to wire 72. It will be assumed that the circuit of this diagram is on a car which is moving to the right, that is, the right end of the figure represents the head end of the car. The contact bars 68 and 73, together with the cooperating contacts, form part of the reverser drum switch which is supplied on each car at each end in the driving motor control circuits in accordance with well-known practice. The contact plates 68 and 73 bridge their respective contacts at the forward or driving end of the car during forward travel, and the corresponding reverser drum switch is and must be set to "off" position under these conditions. Thus, the corresponding contact plates at the other end of the car are out of engagement with their contacts.

It is well to point out here that where a plurality of these cars are connected into a train, the circuits of Fig. 13, insofar as they go, would be interconnected and all the reverser drum switches with the exception of the one at the head end of the train would be in "off" position, while the one at the head end of the train would be in forward position, at which time, as explained, contact plates 68 and 73 interconnect their contacts. Thus, wire 67 is connected to wire 69, through contact plate 68, and wire 72 is connected to wire 74 through contact plate 73. Wires 72 and 74 are connected to wires 70 and 75 respectively, which extend throughout the car, and in a train are interconnected by jumpers so as to extend throughout the train. In the case of multiple unit door control systems, where the door control circuits for a train are interconnected but divided up into units comprising any desired number of cars, the wires 70 and 75 would only extend through each unit under the control of a particular guard.

It might be well to point out here that the circuits of this invention have been arranged for multiple unit door control operation. Such systems are well known in the art and are recognized by the fact that the door control circuits for the cars are so arranged that when any number of cars are connected up into a train, the door control circuits may be arranged by means of drum switches provided at each end of each car so that the train may be divided up into any number of desired units, each unit including any desired number of cars. With that arrangement a guard is provided for operating all the doors of a unit. Thus, in the simplified circuit of Fig. 13, wires 70 and 75 would extend through, by means of the jumpers, all the cars of the unit of which the car of Fig. 13 is a part.

The relay is shown comprising the contact plates 76, 77, 78, 79 and 80, each of which are arranged to bridge a pair of contacts under proper conditions. When the relay is deenergized, contact plates 77 and 79 interconnect their contacts. This relay is in the deenergized position, as shown in the figure. The solenoid winding 81 of the relay is connected by wire 82 to wire 75 at one end and at the other end is connected to wire 83 which, in turn, connects to wire 84. Wire 85 connects wire 70 through the normally closed push button switch 86 to one of the contacts controlled by the contact plate 87. Wire 88 connects the other contact controlled by the contact plate 87 with one of the contacts of the relay, as shown. Wire 92 connects wire 70 through the normally open push button switch 91 to one of the contacts controlled by contact plate 89. The corresponding contact is connected by wire 84 to wire 83.

The connections for the reverser drum switch, the push buttons 86 and 91 and the contacts of the drum switch are duplicated at the other end of the car and interconnected as shown. The drum switch, which is only shown in part and which is provided at each end of each car, is the switch by means of which the door control circuits may be arranged for multiple unit door control operation. In this simplified diagram only a portion of these drum switches is shown. The complete drum switch will be described in detail in Figs. 27, 27—A and 27—B.

One of the contacts of the relay controlled by contact plate 79 is connected by wire 93 to wire 94, and one of the contacts controlled by contact plate 77 is connected by wire 100 to wire 101. Wires 94 and 101 interconnect corresponding contacts of the door control switches A. These contacts are connected in parallel and, of course, the circuit may be extended to include any number of doors. The contact corresponding to the contact connected to wire 94 is connected by wire 96 to a contact of the door control switch B in each case. The contact corresponding to the contact to which wire 101 is connected is connected by wire 103 to another contact of switch B in each case. The switches A are positioned so that when the door is closed they are in the position shown, so that contact plates 95 and 102 do not engage the contacts which they control. On the other hand, the door control switches B are normally closed when the door is closed so that their contact plates 107 and 109 interconnect their contacts. Wires 108 and 110 interconnect the corresponding contacts of switches B. In turn, wires 108 and 110 are connected by wires 111 and 112 to contacts controlled by contact plates 78 and 76 of the relay.

Wire 96 is connected to one of the terminals of motor 64 through wires 97, jumper 98 and wire 99. Likewise, the final terminal of each motor 64 is connected to wire 103, through wire 104, jumper 105 and wire 106. Jumpers 98 and 105 are used at the end of each car of a train except extreme rear and forward end of train, where they are left off so that the end doors of the train will not operate. Wires 71 and 75 of each car of a train are connected by jumpers so as to extend through the train or a unit thereof.

In other words, the circuits are set up as illustrated in Fig. 13 for one car only, but they could easily be extended to any number of cars by interconnecting the proper wires.

The operation of this circuit will now be described, it being pointed out that many parts of the complete circuit have been eliminated in order to illustrate in as simple a manner as possible the principles underlying the circuits of this invention. For that reason, the circuits have been shown for one car, for two doors, and for one side of the car only. By easy duplication, as will be apparent to those skilled in the art, the circuits may be extended to include the motors for the doors on both sides of the cars and for as many doors on each side of each car as is desired.

One of the important principles of this circuit is that the main control relay which is electromagnetically operated is only connected to one phase of the polyphase generator for operation. By extending the control circuits for this relay through all the cars of the unit, all of the relays can be simultaneously operated by one control button. This eliminates the necessity of operating the polyphase generators, of which there is one provided for each car, in parallel. All the relays for all the cars are operated from one phase of one of the generators, whereas the door operating motors for each car are operated by the polyphase generator of that car independently of the generators of the other cars.

When push button switch 91 is closed current flows from the generator through wire 64ª, wire 66, wire 67, contact plate 68, wire 69, wire 70, wire 92, push button switch 91, wire 90, contact plate 89, wire 84, wire 83, solenoid winding 81, wire 82, wire 75, wire 74, contact plate 73, wire 72, wire 71 and wire 65, back to the generator. As a result the solenoid winding 81 is energized, causing it to move its plunger and the contact plates connected thereto. As the plunger moves contact plate 80 makes first, then contact plates 77 and 79 break and finally contact plates 76 and 78 make. This sequence is necessary to prevent direct short circuit on the generator and to maintain the holding circuit for 81.

It is important to note here that wires 70 and 75 are continuously energized through the contact plates 68 and 73 of the reverser drum switch. The operation of the relay causes the establishment of a holding circuit for the solenoid winding 81, which circuit was previously secured through the push button switch 91. For the holding circuit the current flows through wire 82 as before, through the solenoid winding 81 to wire 83, through contact plate 80, which now engages its contacts, through wire 80ª, wire 88, contact plate 87, wire 85ª, normally closed push button switch 86 and wire 85, back to the energized conductor 70. Thus, the operated relay remains in operated position, even though switch 91 is open. The relay will remain in operated position until normally closed switch 86 is opened. The operation of the relay has connected wires 64ª and 65, through contact plates 76 and 78 to wires 112 and 111, respectively, thereby energizing wires 110 and 108. The switches B being closed, the current flows from wire 108, through contact plate 107, wire 103, wire 104, jumper 105, wire 106 to one terminal of each motor 64.

Likewise, current flows from wire 110, through contact plate 109, wire 96, wire 97, jumper 98 and wire 99 to another terminal of each motor 64. As previously stated, the third terminal of each motor is permanently connected by wire 63 and wire 62 to the generator. The result is that the motors 64 are energized, and the doors 1 are moved to open position. If the motor has a brake and locking device, as previously described, these will be operated as stated. The first movement of the door permits switches A to move to a position where their contact plates 95 and 102 interconnect the contacts controlled thereby. As the door nears full open position it engages switches B and causes them to open, thereby deenergizing the motors 64 by interrupting the flow of current to wires 96 and 103. The door is then free to stop or to be retarded and finally stopped as previously described.

In order to effect reverse movement of the doors, it is necessary to energize the motors 64 in a reversed direction. To do this the connections for two of the wires of each motor must be reversed. This has occurred by the movement of switches A as the door began to open. However, the circuits for reverse operation are not complete because wires 94 and 101 connect to the reversing contacts of the relay which are not bridged when the relay is energized. Thus, to close the door it is necessary to brake the holding circuit for the relay, which is done by opening normally closed switch 86. The relay then operates to normal position, moving contact plates 76, 78 and 80 out of engagement with their contacts and moving contact plates 77 and 79 into engagement with their contacts—which is the position of the relay as shown in the drawings.

Current which previously flowed from wire 64ª (during the opening movement of the door) to the middle terminal of each motor is now supplied to the terminal, which had previously been connected to wire 65 and vice versa. Thus, current now flows from the generator through wire 64ª, contact plates 77, wire 100, wire 101, contact plate 102, wire 103, wire 104, jumper 105 and wire 106 to the motor. Current also flows from the generator through wire 65, contact plate 79, wire 93, wire 94, contact plate 95, wire 96, wire 97, jumper 98 and wire 99 to the middle terminal of the motor. Thus, the connections to two of the wires of each motor have been reversed and the motor operates the door in the reversed direction to closed position. The first movement of the door permits the closing of switches B, which partially set up the circuits for door opening operation. However, these circuits are incomplete at the relay which, in the meantime, it will be remembered, is operated to the position shown in Fig. 13. As the doors near the end of their closing strokes, the switches A are operated so that contact plates 95 and 102 move out of engagement with the contact switch they control, thereby deenergizing the motors. The parts have now all returned to their normal position, which is the door closed position illustrated in Fig. 13.

The principles of the circuits of Fig. 13 extend throughout the main circuits to be described later. The important points are that the main relay is operated by current from one phase of the generator and sets up its own holding circuit to maintain it in operated position. This relay cannot be energized unless the reverser switches and the drum switches are in the proper position.

The door itself automatically controls, in conjunction with the relay, the reversal of the connections to the motors so that upon the operation of the proper switches 86 and 91 the doors may be closed and opened. With such a circuit, if a number of cars are connected up for multiple door control operation, all the main relays of the cars of the unit under control are operated by the same phase, insuring proper operation thereof.

Further forms of control circuits for the door operating motors are shown in simplified form in Figs. 14, 15, 16 and 17.

Referring to Fig. 14, the motor generator set for converting the third rail direct current to polyphase alternating current on each car is shown comprising the D. C. motor 122 coupled to the polyphase generator 123. The direct current for the motor 122 is secured through the contact shoe 120 connected to the motor through wire 121. The wires 124, 125 and 126 comprising the alternating current leads are connected to three of the contacts of the relay having the operating solenoid 145. Wires 124, 125 and 126 are connected to wires 127, 128 and 129 respectively, and they in turn are connected to wires 130, 131 and 132 respectively. Wires 127, 128 and 129 connect to three of the contacts of the relay having the operating solenoid 147. Wires 130, 131 and 132 are connected to wires 133, 134, and 135 respectively, which terminate at contacts for the relays operated by the solenoids 146 and 148. Wire 136 is connected to wire 132, wire 137, wire 140 and wire 141. Wires 140 and 141 interconnect terminals of the solenoids 147 and 148 and 145 and 146, respectively. Wires 142, 143 and 144 connect corresponding contacts of one set of relays, as shown.

Wires, 153, 154 and 155 connect the corresponding contacts of the other set of relays. The other contact of solenoid 145 is connected by wire 149 to one contact of the relay controlled by solenoid 146. The corresponding contact of this relay is connected by wire 170 to wire 175. Likewise, the other terminal of solenoid 146 is connected by wire 150 to one of the contacts of the relay controlled by solenoid 145. The corresponding contact of this relay is connected by wire 171 to wire 174. In a similar manner the wires 151 and 152 interconnect the solenoids and contacts of the other set of relays, and the corresponding contacts are connected by wires 168 and 169 to wires 172 and 173. The relay controlled by solenoid 145 has the contact plates 184, 185, 186 and 187 mounted on its operating plunger. The relay controlled by solenoid 146 has the contact plates 188, 189, 190 and 191 mounted on its operating plunger. Likewise, the relay controlled by solenoid 147 has the contact plates 192, 193, 194 and 195 mounted on its operating plunger. Similarly, the relay controlled by solenoid 148 has the contact plates 196, 197, 198 and 199 mounted on its operating plunger.

For each relay there is a contact plate normally bridging the contacts, which it controls, when it is deenergized. These are the contact plates 185, 188, 192 and 196. The wires 142, 143 and 144 are connected by wires 156, 157 and 158 to wires 162, 163 and 164, respectively. Likewise, wires 153, 154 and 155 are connected by wires 159, 160 and 161 to wires 165, 166 and 167 respectively. Wire 177 connects wire 134 with two-spaced contacts of a control switch. The corresponding contacts are connected by wires 176 and 180 to wires 174 and 175. The contact plate 182 interconnects the contacts in proper manner.

Wire 179 connects wire 133 with two-spaced contacts of another control switch. The corresponding contacts are connected by wires 178 and 181 to wires 172 and 173 respectively. A movable contact plate 183 interconnects these contacts properly. Wires 137, 174, 175, 172 and 173 extend throughout the length of the car and terminate in connectors 138 by means of which the corresponding wires of the adjacent cars may be interconnected. Wire 137 represents the common lead for the control circuits for the relays. Wires 174 and 175 represent the other wires for the circuit for closing and opening, respectively, the doors for one side of the car. In a similar manner wires 172 and 173 complete the control circuit for closing and opening, respectively, the doors on the other side of the car.

The linear induction motors, as many as are required, are connected to wires 162, 163 and 164 and wires 165, 166 and 167 in the proper manner, as one skilled in the art would understand, to effect their proper operation. For example, these motors would be connected to these wires in a manner similar to which the motors are connected to the corresponding wires in Fig. 15. The motors and their connections to these wires have been eliminated in Fig. 14 to keep the circuit as simple as possible.

The circuits for the motors for the doors for both sides of the car have been shown, but it will only be necessary to describe the operation of the circuits of the doors for one side of the car, since the operation of the doors on the other side would be exactly the same. The door control switches, one for each side, may be of any suitable construction so that when operated they will move the plates 182 and 183, depending upon which switch is operated.

The circuits for the righthand side of the car will now be traced in detail, it being assumed that the righthand end of Fig. 14 represents the forward and the advancing end of the car. In the position of the apparatus shown the doors are closed. To open the doors contact plate 183 is moved to the right to interconnect the righthand set of contacts. Current flows from the generator 123 through wires 124, 127, 130, 179, contact plate 183, wires 181, 173, 169, contact plate 196 (all of the solenoid windings being deenergized including the solenoid 148), wire 151, solenoid 147, wires 140, 136, 132, 129 and 126, back to the generator. As a result, the solenoid 147 is energized, pulling its plunger in a direction so that contact plate 192 moves out of contact with its contacts and contact plates 193, 194 and 195 bridge their contacts. Current then flows through wires 124, 125 and 126, wires 127, 128 and 129, contact plates 195, 194 and 193, wires 155, 154 and 153, wires 161, 160 and 159, to wires 167, 166 and 165. These wires being energized, the door operating motors connected thereto will be energized and the doors will open. At this point attention is called to the fact that wires 137 and wires 173 of the car circuits illustrated are energized, and likewise the corresponding wires of all the cars which are connected through the connectors 138 are energized so that the corresponding solenoids 147 on each car are energized to operate the switches controlled thereby to set up similar circuits on these cars to energize the door motors. As the doors approach the end of their opening stroke, contact plate 183 may be moved to the central or neutral position to deenergize solenoid 147, with the result that the motors are deenergized. This operation can be carried out automatically by means of door switches as was described in connection with Fig. 13 and as will be described in greater detail later. To close the doors, contact plate 183 is moved to the left to interconnect the lefthand set of contacts. This effects a reversal of connections to the door operating motors to cause them to be energized in the opposite direction to effect door closing. In the closing position of contact 183 current flows from the generator 123 through wires 124, 127, 130, 179, contact plate 183, wires 178, 172, 168, contact plate 192, wire 152, solenoid 148, wires 140, 136, 132, 129 and 126 to the generator. As a result, solenoid 148 is energized, causing its plunger to move contact plate 196 out of engagement with its contacts and causing contact plates 197, 198 and 199 to interconnect their contacts. Current then flows to the motors through wires 124, 125 and 126, wires 127, 128 and 129, wires 130, 131 and 132, wires 133, 134 and 135, contact plates 198, 199 and 197, wires 154, 155 and 153, wires 160, 161 and 159 to wires 166, 167 and 165. Through wires 165, 166 and 167 the current flows to the door motors to which they are connected. Thus, whereas wires 124 and 125 were connected to wires 167 and 166, respectively, during the opening operation of the doors, these same wires 124 and 125 are connected to wires 166 and 167, respectively, during the closing operation of the motors. In other words, two of the wires have been reversed during the closing operation with respect to the current source to reverse the operation of the motors. When the doors are closed or nearly closed, contact plate 133 is moved to neutral position to deenergize the motors.

At this point attention is called to the fact that wires 137 and 172 of the car circuits illustrated are energized, and likewise the corresponding wires of all the cars which are connected through the connectors 138 are energized so that the corresponding solenoids 148 on each car are energized to operate the switches controlled thereby to set up similar circuits on these cars to energize the door motors.

As is described in connection with Fig. 13, door control switches may be employed to automatically deenergize the motors as the doors near the end of their closing stroke. Likewise, the motors may have any suitable construction such as, for example, that shown in the various figures and may include a braking and locking mechanism as shown in Figs. 9, 10 and 11.

Another form of control circuit for the door motors is shown in Fig. 15, in which case the relays, instead of being operated by means of solenoids, are operated with linear induction motors of a construction similar to those used for operating the doors. In connection with this figure, only the parts for the doors for one side of the car have been numbered and will be described in detail, since the parts are exactly the same and the connections thereto for the other side of the car.

In the circuit arrangement of Fig. 15, three pairs of doors and the motors for operating them have been shown for each side of the car, but it is apparent that by simple duplication any number of motors may be connected in circuit. As before, the motor generator set is employed. The wires 124, 125 and 126 connect the generator with wires 200, 201 and 202 respectively. These wires 200, 201 and 202 are connected to corresponding sets of contacts for the control switches S. There are two of these switches S, one for controlling the motors on one side of the car and one for controlling the motors on the other side of the car. Corresponding sets of contacts are connected by wires 203, 204 and 205 to the linear induction motor 208 for operating the main control switch for the door motor circuits. Wires 204 and 205 are connected by wires 206 and 207, respectively, to wires 245 and 246 respectively. Wires 204 and 205 are also connected by wires 243 and 244 to contacts of the control switch S, as shown. Wire 203 is the common wire, while wires 204 and 205 are the wires by means of which reversal of the linear induction motor 208 is effected upon the proper operation of the control switch S. Wire 203 is connected by wire 250 to wire 251 which extends throughout the car to the couplers 247 at each end of the car, as before. As before, wires 245 and 246 are the closing and opening wires by means of which the linear motor 208 may be operated in the proper direction to actuate the main switch to the proper position for closing and opening operations of the doors. The rod 209 of the main switch is the secondary of the linear induction motor and is moved when the motor is energized. This rod 209 is slidably supported in suitable bearings and passes through the fixed support 210. Secured to the rod 209 are the collars 211 and 212, between which and the bracket 210 are mounted the springs 213. These springs normally hold the rod 209 and the contact plates 217, 218, 219, 237, 238 and 239, which are secured thereto, in the position shown, at which time they are out of engagement with the contacts which they control. The lower lefthand set of contacts are connected by wires 214, 215 and 216 to wires 124, 125 and 126 respectively. The lower righthand set of contacts are connected by wires 240, 241 and 242 to wires 125, 124 and 126 respectively. The upper lefthand set of contacts are connected by wires 220, 221 and 223 to wires 224, 225 and 226 respectively. The upper righthand set of contacts are connected by wires 234, 235 and 236 to wires 220, 221 and 223 respectively. Wires 224, 225 and 226 are connected to wires 230, 231 and 232 of the lefthand door operating linear induction motors. Wires 224, 225 and 226 are connected by wires 227, 228 and 229 to righthand door operating linear induction motors. It is apparent that the motors for each set of doors must be connected for reverse operation, since the doors move in opposite directions, away from each other in opening and towards each other in closing.

The parts are shown in Fig. 15 in door closed position. In order to open the doors on the upper side of the figure the contact plates of the upper switch S are moved to the left to interconnect their contacts. Current then flows from the generator 123, through wires 124, 125 and 126 to wires 200, 201 and 202, through the three contact plates to wires 203, 205 and 204 to the linear induction motor 208. This energizes the motor 208 in the proper direction to cause rod 209 to move to the left.

As a result contact plates 217, 218 and 219 bridge their contacts. At the same time current flows through wire 203 to wire 250 and thence to wire 251 which extends through the car and through the other cars which have their connectors 245 interconnected. Likewise, current flows from wires 204 and 205, through wires 206 and 207 to wires 245 and 246 which extend through all the cars which have their connectors interconnected. Thus, the induction motor 208 which is on each of the interconnected cars is energized to operate the switches controlled by rod 209 as just described. In each case current then flows from the generator 123 through wires 124, 125 and 126 to and through wires 214, 215 and 216, contact plates 217, 218 and 219, wires 220, 221 and 223, wires 224, 225 and 226 and wires 230, 231, 232 and 227, 228 and 229 to energize the motors 248 on the cars in the proper direction to cause the doors 249 to open.

As previously described, switch S may be moved back to the position shown in the figure to deenergize the door motors as they approach the end of their opening stroke. This operation may be carried automatically by the door controlled switches which are not shown in this figure. When switch S is moved back so that the plates are out of contact with any of the contacts, motor 208 is deenergized and the springs 213 move the rod 209 and the contact plates connected thereto back to the normal position shown in the figure.

In the door closing operations switch S is moved so that the contact plates shift to the right to interconnect the righthand set of contacts. Current then flows from wires 200, 201 and 202 through the contact plates to wires 203, 245 and 244 to wires 203, 204 and 205. As a result the motor 208 is energized to pull rod 209 in the opposite direction to the right so that contact plates 237, 238 and 239 interconnect their contacts. Current then flows from wires 124, 125 and 126 through wires 241, 240 and 242, contact plates 238, 237 and 239, wires 235, 234 and 236 to wires 221, 220 and 223, and finally to the motors 248, as before, to effect their operation in the reverse direction to close the doors. The operation of the plates of switch S to the right merely effects a reversal of connection in wires 204 and 205 to reverse motor 208 and in wires 220 and 221 to reverse the motors 248.

A very simplified arrangement is shown in Fig. 16 in which relays are not employed, but a drum switch manually operated is used to effect the opening and closing of the doors. There are two of these switches S similar to the one shown in Fig. 15. The upper one controls the doors at the top of the figure and the lower one controls the doors at the bottom. The generator 123 is connected by wires 124, 125 and 126 and wires 214, 215 and 216 to the various contacts of the drum switch, as shown. The remaining contacts at the left are connected by wires 220, 221 and 223 to wires 226, 225 and 224, which in turn are connected to the motors by wires 227, 228 and 229. The remaining contacts at the right are connected by wires 223ª and 221ª to wires 225 and 224.

Thus, when the contact plates of switch S are moved to the right the generator supplies current to the motors to open the doors and when they are moved to the left current is supplied to close the doors. Wire 220 may be termed the "neutral" wire which is connected to wire 226 in either position of the contact plates, whereas the other two wires from the current source are reversed to effect reverse operation of the motors. Thus, when the plates are to the right wire 223ª is connected to wire 126, and wire 221ª is connected to wire 125. Wire 223ª is connected to wire 225, and wire 221ª is connected to wire 224. When the plates are moved to the left, wire 126 is connected to wire 223, and wire 125 is connected to wire 221. Wire 223 is connected to wire 224, and wire 221 is connected to wire 225. Thus, the switch operates to connect in one position wires 125 and 126 to wires 224 and 225, while in the other position they are connected in the reverse order, namely, to wires 225 and 224. Thus, with this simple arrangement, it is possible to open and close the doors.

The use of intermediate relays is desirable, however, from the view point of safety. With the simplified arrangement of Fig. 16, if the switch S should accidentally be moved to opening position when the car is in motion, the doors would open.

In Fig. 17 is shown a circuit arrangement somewhat similar to that in Fig. 14. Whereas in the arrangement of Fig. 14 the relays are operated by current from one phase of the generator, in Fig. 17 the relays are operated by means of an independent current source, such as the battery 230ª. It will not be necessary to refer to all the parts and their connections in this figure, since they are substantially the same as connections in Fig. 14 and, hence, the same reference numerals have been used to indicate similar parts. Instead of interconnecting the windings of relays 145 and 146 as they were interconnected by wire 141 in Fig. 14, they are merely grounded in the arrangement of Fig. 17. For that reason the energizing wire 136 of Fig. 14 has been eliminated. In essence, the connections are the same in Fig. 17, however, since these terminals of the windings 145 and 146 are grounded as is the current source 230ª. The other terminal of the current source is connected to two of the contacts of the control switch by means of wire 231ª. Wires 232ª and 233ª are also connected to this terminal and extend through the car in a manner similar to wire 137 in Fig. 14. Wire 231ª in the arrangement of Fig. 17 corresponds to wires 177 and 179 of Fig. 14. It will be at once apparent that the main difference between these two arrangements is that in Fig. 14 the relays are energized from the generator 123, while in Fig. 17 they are energized from the current source 230ª. Hence, the interconnections between the generator, the control switches and the relays have been eliminated in Fig. 17, and the current source 230ª is interconnected with the relays through the control switches.

In the operation of the circuit of Fig. 17 to open the doors, plate 182 is moved to the right to interconnect the righthand contacts. Current then flows from the current source 230ª, through wire 231ª, plate 182, wire 180, wire 174, wire 171, contact plate 184, wire 150, winding 146 and back to the current source through the ground connection. The switches controlled by the solenoid winding 146 are then closed to energize the motors from the current source 123 exactly as in the case of Fig. 14. To close the doors, contact plate 182 is moved to the left to interconnect the lefthand set of contacts. Current then flows from the source 230ª through wire 231ª, contact plate 182, wire 176, wire 175, wire 170, contact plate 188, wire 149 and through the winding 145 to ground. Of course, this circuit is complete because winding 149 is deenergized when the contact plate 182 is moved out of engagement with the righthand set of contacts. The energization of solenoid winding 145 causes the switches controlled thereby to close to complete circuits to energize the motors 248 for closing operation exactly as occurred during the closing operations of the arrangement of Fig. 14. Of course, as in all these cases, the mechanism on the other side of the car may be similarly operated by means of the control switch provided therefor, as shown.

In Fig. 18 is shown a control circuit for the door operating motor, in which circuit are included door operating switches as previously mentioned by means of which the energization of the motor in the proper direction is controlled. As before, the door 1 is supported on hanger plates 6 on which are mounted antifriction guide rollers. At 248 is the linear induction motor suitably supported for cooperation with the bar secondary 248ª which is pivotally supported on one of the brackets 6 at 251. The wire 252 is connected to the positive side of a current source and terminates in one contact which, in connection with the contact connected to wire 254, comprise a switch controlled by the contact plate 253. This plate is suitably connected to the bar 248ª. Wire 254 extends to any suitable form of indicating device placed adjacent the motorman's position and to his master controller in accordance with well-known practice, in order that he be signalled when the door is closed and locked, and further that he be given control of the master controller when these conditions are attained. In the event that a plurality of doors are used, contacts at 253 should be connected in series with source of power and with motorman's indication and master controller. Thus, the bar 248ᵃ is in the position shown when the motor is deenergized, at which time contact plate 253 interconnects wires 252 and 254 to energize the circuits connected thereto. A door operated switch is shown mounted so that the contact plates thereof are out of engagement with the contacts which they control when the door 1 is closed. This switch has contact plates 256, 262 and 263 mounted on a plunger which engages the door when it is closed. Wire 228 is the neutral wire which extends to the linear induction motor. Wires 260 and 261 terminate in contacts engaged by the contact plates 262 and 263. Wires 229 and 227 terminate in contacts which correspond to the contacts on which wires 260 and 261, respectively, terminate. Wires 227 and 229 connected to the induction motor extend on and terminate at contacts forming part of a second door operated switch which is mounted in a position to be engaged by the door when it is fully open, which is the position indicated by the dotted line 1ᵃ. Wires 260ᵃ and 261ᵃ terminate in similar contacts. These sets of contacts are controlled by the contact plates 264 and 265 of the door switch. Wires 255 and 257 terminate in contacts controlled by the contact plate 256. Wire 257 is connected to an electric signal device, such as a lamp 258, which has its other terminal connected to the returned wire 259. The signal device 258 is the conductor's or guard's signal indicator to advise him when the door is closed and locked. Wires 260, 261 and 260ᵃ and 261ᵃ run on back through relays and control switches, as described in connection with the previous figures—Figs. 13, 14, 15, 16 and 17. Thus, when the circuits are completed to energize wires 260ᵃ and 261ᵃ current flows through the contact plates 264 and 265 to and through wires 229 and 227 to the motor 248.

It will be remembered that the door switch controlled by the rear edge of the door is closed when the door is closed, as is assumed in beginning the description of this operation. Wire 228 is, of course, directly energized so that the motor is energized lifting bar 248ᵃ slightly and drawing it to the left, carrying the door with it. As bar 248ᵃ is raised the motorman's signal circuit is deenergized by the lifting of plate 253 off its contacts. As soon as the door begins to move towards open position (to the left, Fig. 18), contact plates 256, 262 and 263 engage their contacts.

As a result, the conductor's or guard's signal device 258 is energized, apprizing him of the fact that the doors are unlocked and open. The induction motor 248 is not energized from wires 260 and 261, because the control switches and relays which occur further back in the circuit are, of course, not set to the closing position. Just as the door completes its opening stroke, it engages the door switch at the left, causing contact plates 264 and 265 to move out of engagement with their contacts. As a result, motor 248 is deenergized and the door comes to a stop in full open position. To close the door the main control switch, not shown here but previously described, is moved to closing position so that the motor is energized through wires 228 and 260 and 261 through contact plates 262 and 263, and wires 229 and 227. This time the motor is energized in the reverse direction so that the door begins to close. Just as the door completes its closing stroke the righthand door switch is opened, signalling to the guard the fact that the door is closed and locked by deenergizing the signal device 258. In the meantime, the lefthand door switch is closed, but exerts no influence since the motor circuits through it are not energized. As soon as the door completes its closing stroke and opens the righthand door switch, motor 248 is deenergized and bar 248ᵃ falls to the position shown in Fig. 18 so that contact plate 253 completes the motorman's signal circuit to indicate that the doors are closed and locked and permits him to operate his controller to start the train.

A modified arrangement is shown in Fig. 19 in which the door 1 shown in closed position is supported by the hanger 6, to which the secondary bar 248ᵇ is secured. The primary of the motor 248, as before, is supplied by current through the neutral wire 228 and the wires 227 and 229. In this form of the device the motorman's indicating circuit and master controller control circuit, instead of being completed by a switch controlled by the secondary bar, is controlled by a switch forming part of the righthand door switch. In other respects, this circuit is the same and operates the same and need not be traced in detail.

It should be noted that the details of Figs. 18 and 19 are connectible directly into the arrangements of the circuits of Figs. 13 to 19, inclusive. The door control switches are included in the wires which extend from wires 162, 163 and 164 of several forms of the device shown in these figures. All of the features of these circuits, as illustrated in different forms in Figs. 13 to 19 inclusive, will be embodied in a complete circuit and described in connection with Figs. 27, 27—A and 27—B.

Likewise, the arrangements of Figs. 20 and 21 may be included in the complete circuit, if desired.

In Fig. 20 a combined door motor control circuit and locking circuit has been disclosed. The motor primary 248 cooperates with the bar secondary 240ᵇ which is secured to the door 1 as before. Wire 228 is the neutral wire which runs directly to the motor. Wires 227 and 229 are connected to contacts of a relay, as shown. At C is a controller or switch for controlling the motor circuits for opening and closing the door. This controller consists of four movable contact plates 281, 282, 283 and 284. At the left of these plates are five fixed contacts arranged as shown, and at the right are six fixed contacts. The two upper contacts are connected by wires 280 and 281ᵃ to contact strips 275 and 277. These contact strips together with contact strips 278, 276 and 274 are secured to a suitable insulating support 273. A shoe 271 which is grounded by wire 272 is connected to the door by means of the link 270. Contact strip 276 is connected through resistance 279 to wire 280. The next lower set of fixed contacts of controller C are connected by wire 302 to wire 301 which connects with two of the contacts of the relay. The remaining two contacts of the relay are connected by wire 298 to the lowermost lefthand contact of controller C and to the second righthand contact from the bottom. The relay comprises a winding 286 which controls a plunger on which are mounted the contact plates 300 and 303. The parts of the relay are shown in normal deenergized position. Wire 296 connects two of the contacts as shown to wire 298a which extends to the motor 248. Likewise, wire 297 connects two of the contacts of the switch C to wire 229a which extends to the motor. One terminal at the solenoid winding 286 is connected by wire 287 to the positive side of a current source through a suitable switch, not shown. The other terminal of this winding is connected to contact plate 281 of the controller C. Wire 287 is also connected by wire 288 to the contact plate 284 of the controller C. The lowermost righthand fixed contact of controller C is connected by wire 299 to one terminal of the electromagnet 290 which has its other terminal grounded through wire 291. The electromagnet 290 is supported on a bracket 292 which also pivotally supports the latch bar 293. This latch bar in its normal position, as shown in the figure, engages a lug 294 secured to the door to hold it locked in closed position.

The operation of this circuit will now be given. Wires 227, 228 and 229 are connected to the output of the polyphase generator either directly or through relays and control switches, as desired. Assuming that these wires are directly connected to the current source circuits will be completed to open the door when the contact plates of controller C are moved to the right. This movement of the contact plates causes contact plate 284 to engage the righthand lowermost contact so that current flows from wire 287 through wire 288, contact plate 284 and the cooperating fixed contact, wire 299, electromagnet 290 and wire 291 to ground. The energization of the electromagnet 290 causes it to raise the latch bar 293 out of engagement with the lug 294 on the door. As a result the door is unlocked. Current flows through wire 228 directly to the motor 248. It also flows through wire 227, contact plate 300, wire 301, wire 302, contact plate 282 and wire 298a to the motor 248. Current also flows through wire 229, contact plate 303, wire 298, contact plate 283 and wire 229a to the motor.

As a result, the motor is energized, causing it to draw the secondary bar 248b to the left, carrying the door 1 with it. When contact shoe 271 engages contact strip 275, current flows through wire 287 through solenoid winding 286 to contact plate 281, wire 280, contact strip 275, contact shoe 271 and thence to ground through wire 272.

This energizes solenoid winding 260, causing it to draw its plunger upwardly to move contact plates 300 and 303 into engagement with the upper sets of contacts. Wire 229, instead of being connected to wire 229a, is now connected to wire 298a, and wire 227 instead of being connected to wire 298a is connected to wire 229a. As a result, the motor 248 is energized in reversed direction and is slowed down in its movement. The parts are so proportioned, however, that the door does not stop before shoe 271 passes off contact strip 276. When shoe 271 engages contact 276, solenoid 286 is maintained energized through resistance 279. The resistance is proportioned so that as shoe 271 engages contact 276 the current to solenoid 286 is maintained through resistance 279, sufficient current flowing to hold the relay in operated position. However, as the door closes, when shoe 271 engages contact 276 there is not enough current to solenoid 286 through resistance 279. In other words, the circuit through resistance 279 will not supply enough current to initiate operation of solenoid 286 but will maintain it operated after energization through wire 280. The motor 248 is deenergized and the door is free to move onto full open position under its own momentum when the shoe 271 leaves contact 276. The lengths of contact strips 274, 275 and 276 are so proportioned to effect this result.

When contact shoe 271 disengages contact strip 276, the circuit to the solenoid 286 is not energized because the contact plates of controller C are in the righthand position. Strip 278 is, of course, unconnected with any of the apparatus. Hence, as soon as the door under its own momentum moves off of contact strip 276, the solenoid winding 286 is completely deenergized and the circuits are completed to energize the motor 248, as before, so that the door completes its opening stroke under the power of the motor. When the door is fully open, controller C is moved to the neutral position shown in the figure. As already described, a door control switch can be included in the circuits to deenergize the motor when the door is fully open. To close the door the contact plates of the controller C are moved to the left. Current then flows through wire 228 to the motor 248, through wire 227, contact plate 300, wire 301, contact plate 282, wire 297 and wire 229a to the motor and through wire 229, contact plate 303, wire 298, contact plate 283, wire 296 and wire 293a to the motor. The motor is now energized in the reversed direction and starts to close the door. When the contact shoe 271 reaches contact plate 277, solenoid winding 286 is energized through wire 281a and contact plate 281. The solenoid then moves contact plates 303 and 300 to the upper set of contacts to reverse the motor to retard the movement of the door. The momentum of the door, however, carries shoe 271 off of contact plate 277, thereby deenergizing solenoid 286. The contact plates 300 and 303 again move down to the lower set of contacts to deenergize the motor to completely close the door. When the door is completely closed, controller C is moved to neutral position to deenergize the motor.

As before, a door control switch can be included for deenergizing the door motor as the door reaches closed position. As stated, the contact strips can be so proportioned that the motor will operate the door in a fairly uniform manner. This arrangement prevents the door from moving too rapidly in opening and closing movements and prevents it from slamming at the end of its stroke.

Another circuit arrangement is shown in Fig. 21 in which the door 1 is provided with the hangers 6 to which the secondary bar 248b is secured. The primary of the motor 248 is suitably supported in the proper position with respect to the secondary bar. The door is provided with a lug 316 which is in the path of movement with the latch bar 314 pivotally secured to the bracket 315, on which is supported the electromagnet 312. This magnet is grounded by the wires 317. The other terminal of the magnet is connected by wire 310 to a suitable current source through a switch. A second latch bar 319 is pivotally supported on the bracket 320 in a position to engage the lug 316 of the door when it is fully open. An electromagnet 318 is supported on this bracket and has one terminal grounded by the wires 317. The other terminal of this electromagnet is connected by wire 311 to a current source through a suitable switch. Thus, when the circuit through wire 310 is completed electromagnet 312 is energized to move the latch bar 314 out of the path of movement of stop 316. This unlocks the door. When the door is fully open latch bar 319 engages the stop 316 of the door and locks the door in open position. When the circuit through wire 311 is completed electromagnet 318 is energized, raising latch bar 319, unlocking the door so that it may be moved to closed position.

At 322 are suitable pulleys over which a manually operable cord or wire 321 extends and which is connected to the latch bar 314 to permit manual unlocking of the door in an emergency. Neutral wire 228, as before, is connected to the motor 248. The other wires 227 and 229 connect the motor with contacts of the door switch, as shown. The corresponding contacts are connected by wires 260 and 261 to the current source through relays and switches, as previously described. Wire 252 is connected through a contact, plate 253, and another contact to wire 254 and extends to the motorman's indicating device and master controller as previously described. Thus, when the door is closed and locked as shown, the motorman is signalled the fact and is permitted to operate his car controller. Wire 255 is connected through a contact plate 256 and another contact to wire 257 to and through a signal device 258 and by wire 259 to the other side of the current source. As to the circuits for the motor, door control switch and the signal circuits, it is not necessary to go into detail as this arrangement is similar to that in this respect shown in Fig. 19.

Figs. 22 to 25, inclusive, show diagrammatically the windings for several forms of induction motors employing various kinds of alternating current. Thus, the arrangement of Fig. 22 shows a single phase linear induction motor split winding for use in starting in connection with a resistance and condenser. The single phase generator 325 is connected by wires 326 and 327 to the contacts of a relay. The corresponding contacts are connected by wires 329 to the winding 330 of the motor and by wire 334 to one terminal of a three-pole double throw switch 332 respectively. These sets of contacts are controlled by contact plates 328 and 333 attached to the plunger controlled by solenoid 337.

Wire 329 is connected by wire 331 to the three-pole switch as shown. The other terminal of winding 330 is connected by wire 335 to wire 334. One terminal of the field winding 344 is connected by wire 341 to the three-pole switch, and the other terminal is likewise connected to this switch through a resistance 343 and a condenser 342. The solenoid 337 is connected to the three-pole switch through a suitable current source 338 as shown. The condenser and resistance are provided to produce a displacement current for starting. When the switch arms of the three-pole switch are thrown to interconnect the two upper sets of contacts, solenoid winding 337 is energized to complete the circuits through the relay to energize the motor for operation in one direction. When the switch arms are thrown to interconnect the middle set of contacts with the lower set of contacts, solenoid 337 is again energized, but the windings of the motor are energized in reverse direction. The turns of each set of field coil windings are connected in series in this figure.

In this arrangement of Fig. 23, the turns of one set of field coil windings are in series and the turns of the other set are in parallel. In this arrangement the circuit is otherwise similar to that of Fig. 22, with the exception that the resistance and condenser are omitted.

In Fig. 24 is shown a three-phase linear induction motor with its windings connected in delta. The three-phase generator 350 is connected by wires 351, 352 and 353 to wires 357, 358 and 359, respectively, through the contact plates 354, 355 and 356 and the contacts which they control, of the relay. Wire 357 is connected by wire 360 to the winding 362 of the motor. The other terminal of this winding is connected by wire 361 to wire 358. One terminal of winding 365 is connected by wire 363 to the five-pole double throw switch 369, to which the three wires 357, 358 and 359 are connected as shown. The other terminal of winding 365 is connected by wire 364 to switch 369. One terminal of winding 368 is connected by wire 366 to switch 369, and the other terminal is connected by wire 367 to switch 369. Solenoid 370 is connected through the current source 371 to the switch 369. In one position of the five switch arms of switch 369 the two upper sets of contacts are interconnected to energize the motor in one direction, and in the other position when the two lower sets of contacts are interconnected the motor is energized in the other direction. In either position of this switch, solenoid 370 is energized to close the relay at its contacts.

The arrangement of Fig. 25 is similar to that of Fig. 24, except that the windings of the motor are arranged in star or Y connection. In this case only a three-pole double throw switch 372 is necessary.

Fig. 26 shows a two-phase connection. The two-phase generator 373 is connected by wires 376 and 377 to the relay, and by wire 374 to one terminal of the winding 375, and by wire 382 to the three-pole double throw switch 383. The relay contacts are connected by wire 380 to one terminal of winding 386 and by wire 381 to switch 383. The winding 387 is connected by wire 384 to switch 383 and winding 388 is connected by wire 385 to switch 383. Windings 387 and 388 are connected in series. The relay solenoid 389 is connected through current source 390 to the switch 383. In one position of this switch the middle set of contacts are connected with the upper set and in the other position with the lower set to energize the motor in the corresponding direction. In either position of the switch when closed, solenoid 389 is energized.

A complete system for one car embodying the various principles and constructions described in the foregoing part of this specification, in connection with the previous figures, is set forth diagrammatically in Figs. 27, 27—A and 27—B which taken together, give a complete wiring diagram of the system. The circuits for one car only have been shown because, as is, of course, well known to those skilled in the art, each car will have exactly the same circuits which may be interconnected by means of the drum switches at each end of the car to meet various conditions. The connections to the drum switches have been arranged to permit of multiple unit door control which is well known in this art. By means of these switches the door controlling and signalling circuits may be broken up for a train of any number of cars to form any desired number of units, each comprising any desired number of cars.

The circuits when so interconnected are arranged in accordance with the principles of multiple unit door control, so that a single guard may control all the doors on either side of the cars of his units. In addition, the signalling circuits are interconnected so that he can signal the other guards and the motorman as desired, as will be described in detail later.

Referring to the circuit diagram for one car, the contact shoe for the third rail, by means of which power is introduced from the third rail into the car, which would in this case be direct current, is shown at 500. This contact shoe 500 is connected by wire 501 to wire 502 which extends throughout the length of the car. At each end of the car the wire 502 terminates in a contact of the coupler at each end of the car through which, in connection with the usual jumper, the circuits are established through those cars which comprise the train. Wire 502 is connected by wire 503 and switch 504 to one of the input terminals of the D. C. motor 505 which drives the polyphase generator 506. The other terminal of the motor is grounded in accordance with usual practice. The motor 505 and the polyphase generator 506, in this case a three phase generator, are mechanically coupled to provide a motor generator set. The slip ring brushes of the polyphase generator are connected by wires 507, 508 and 509 to the three lefthand contacts of the relay which is operated by the solenoid 513'. These three contacts and a corresponding set of contacts at the right are interconnected by the contact plates 539, 510 and 511. The two upper righthand sets of contacts are connected by wires 513 and 514 to wires 517 and 518. The next lower righthand contact of the lefthand relay is connected to the corresponding lefthand contact of the relay controlled by solenoid winding 576. This connection is interconnected by wire 515 to wire 516.

In the car which is shown, as outlined in these figures, there are provided ten doors on each side of the car. Each door comprises two sections mounted to slide in accordance with well known practice in opposite directions for opening and closing operations. Each half of each door is operated to opening and closing position by means of linear induction motors which have fixed primaries, and secondaries in the form of bars attached to the doors, as indicated diagrammatically in these figures and shown in complete detail in various forms in the previous figures. Each door is provided with two door switches indicated diagrammatically in the drawings and by the legends "D S O" and "D S C". The door switch D S C is in the position shown when the doors are closed. There is one of these door switches D S C for each pair of doors, and wires 517 and 518 are connected through each of these door switches D S C to two of the wires for each of the motors. Thus, the lower set of contacts for each door switch D S C is connected by wires 519 and 520 to wires 521 and 522, respectively, of each door motor. The remaining leads 523 of each door motor are connected to the wire 516. Wires 517 and 518 extend to each end of the car and terminate at the righthand end of the car in two spaced contacts which are interconnected by means of the contact plates 527 and 528 with corresponding contacts which are connected by wires 529 and 530 through the extreme righthand door switch D S C to the door motors as in the case of the other door motors. At the lefthand end of the car wires 517 and 518 terminate in a set of contacts which are interconnected with a similar set of contacts by contact plates 534 and 535. These similar contacts are connected by wires 536 and 537 through the door switch D S C for the extreme lefthand door to the door motors for that door. For each of these end doors the third wire 523 is connected to wire 516 as before. At this point it should be noted that the circuits for one side of the car only will be described in detail, since the circuits for the doors of the other side of the car are exactly the same unless they are specifically distinguished. As a result of these connections it will be seen that the last set of doors on each side of the car at each end pass through a separate switch which is indicated in the diagram by the legend "air end door cutout". The lower four contacts of the righthand air end door cutout switch are connected by wires 531 through the door switch D S C for the lower righthand door to the motors. Likewise, the lower set of contacts for the air end door cutout switch for the lefthand end of the car are connected by wires 538 through the door switch D S C for the lower lefthand door. In other words, the two air end door cutout switches, one for each end of the car when deenergized, cut out of circuit the door motors for the end doors of the car. The contact plates for the air end door cutout switches are mounted upon a rod 524 and insulated from each other, as shown in connection with the right hand switch. In each case this rod is connected to a piston which operates in an air cylinder 525 for the righthand switch and the air cylinder 532 for the lefthand switch. Fluid pressure pipe connections 526 and 533 for these cylinders, respectively, are provided. These pipes 526 and 533 connect in accordance with well known practice with the air coupler which interconnects the air system for the cars when they are coupled up into a train. Thus, if we assume that the righthand end of the car of these figures is the head end of the car or the train into which it is coupled, the righthand air end door cutout switch will be in the position shown in Fig. 27—B. If no other cars are coupled to this car, a similar condition occurs with respect to the lefthand air end door cutout switch. However, if other cars are coupled to the car of these figures so that it is the head end car, when the air coupling is made between the car of these figures and the next car to the left, air will be supplied through pipe 533 to the cylinder 532 so that the piston thereof moves upwardly, carrying with it the rod and contact plates connected to it, so that the door engines for the two extremely lefthand doors will be connected in circuit so that they will be operated with and will function the same as all the other doors. However, in the case of the two righthand doors adjacent the head end of the train, they will be cut out of circuit since there is no air pressure on pipe 526. The purpose of this is that the motorman being adjacent these doors they are not usually operated. Similar conditions will obtain with respect to the last two doors on the last car, which likewise are cut out of circuit since there is no air coupling at the end of the car. The couplers which produce these results are well known in the art and are arranged so that when they are not connected there is no air on the pipe leading to the air end door cutout switches, but when a coupling is made air is supplied to these pipes.

One terminal of solenoid 576 is grounded and the other terminal is connected by wire 574 to wire 540. Wire 540 extends to two of the contacts of each drum switch at each end of the car.

At this point it should be noted that the drum switches, one for each end of each car, are of any well known construction in which the movable drum is provided with a plurality of contact plates which cooperate with two sets of fixed contacts, so that in one position of the contact plates one set of contacts are interconnected, and in the other position of the contact plates the other set of contacts are interconnected. In other words, these drum switches have three positions which have been indicated by the legends "Car", "Off" and "Train". The drum switches are shown in the off position. The connections for the righthand drum switch will not be described in detail because at the head end of the train the drum switch is set, as shown, to the off position and all circuits leading to this drum switch are interrupted there.

Wire 540 extends through the car to the left and terminates in two contacts, as shown, controlled by contact plate 541 of the lefthand drum switch. When this drum switch is in train position contact plate 541 connects wire 540 with wire 542 which extends to the coupler which, in connection with a jumper, continues this wire into the next car. Wire 543 (Fig. 27) terminates in a contact of the drum switch controlled by contact plate 548. The wire 543 terminates at its other end in a contact controlled by the push button 544. The corresponding contact is connected by wire 545 to the three lefthand contacts of the lower push button switch and by wire 735 to one contact of a push button switch which is controlled by the contact 702. The other contact of the push button switch is connected by wire 701 to a lamp or other signal device 700 which is grounded. Wire 701 is connected by wire 701a to a contact of the drum switch controlled by contact plate 703. The signal device 700 may be termed a "secondary" signal which is really an emergency signal for use in case signal 635 is inoperative for any reason. It is noted that the signal devices are provided in pairs and are connected in parallel, so that if one burns out the other is still operative. Wire 545 is also connected to one of the lower contacts of the drum switch and is interconnectible with another contact, to which a suitable current source is connected through wire 546 and which contacts are interconnectible by the contact plate 546. A contact corresponding to the contact to which wire 543 is connected is connected to wire 549 which extends throughout the car. Contact plate 548 in one position interconnects wires 543 and 549. Wire 549 extends to the righthand end of the car and terminates in similar contacts at the righthand drum switch.

As shown in Fig. 27—A, wire 549 is connected by wire 550 to a solenoid winding 551, which is grounded, and by wire 552 to the lower righthand contacts of the master door relay. This contact is interconnected by contact plate 553 to a corresponding contact which is connected by wire 554, which extends towards the lefthand end of the car to the middle lefthand contact of the push button switch and is normally connected through the contact 544a to wire 545. Wire 554 also extends to the righthand end of the car to the upper righthand push button switch, as shown. Wire 555 (at the top of the figures) extends throughout the length of the car, and at the righthand end is connected to a suitable current source. At the lefthand end of the car it connects to the lower lefthand contact of door switch D S O and by wire 556 to one of the upper contacts of the lefthand drum switch, which is interconnected by contact plate 557 to a similar contact connected by wire 558 to the coupler. Wire 555 (Fig. 27—A) is connected by wire 559 to the upper lefthand contact of the master door relay. This contact is controlled by contact plate 560 which interconnects it with a corresponding contact which, in turn, is connected by wire 561 to the middle lefthand contact of the door interlock switch. A door lock magnet winding 562 is connected to wire 561 and grounded. When solenoid winding 562 is energized it moves the rod 562a which extends throughout the length of the car and is provided with door locking mechanism, so that in one position all the doors are locked in closed position and in the second position all the doors are unlocked in closed position. If desired magnet 562 may be part of a magnet valve which, when energized, supplies air to a cylinder for operating rod 562a. This rod 562a is moved from locking to unlocking position when the door lock magnet 562 is energized. When this rod is so moved it moves the door interlock switch connected thereto from the position shown, so that the upper set of contacts are disconnected and the two lower sets of contacts are interconnected. These parts just described apply to the doors for the upper side of the car with respect to the figures, and a similar arrangement is provided for the doors for the lower side of the car, which are shown but not described in detail because the connections are similar and the operation the same.

The middle righthand contact controlled by the contact plate 563 is connected by wire 564 to wire 565 which extends throughout the car. Wire 565 is connected to ground through a conductor's indication or signalling device 600, of which two are provided in parallel for safety. Wire 565 extends to the righthand end of the car and is connected by wire 566 to a contact controlled by contact plate 567 of the righthand drum switch. The corresponding contact controlled by this contact plate is connected by wire 568 which extends to the coupler. Wire 565 extends to the lefthand side of the car and terminates in a contact controlled by contact plate 566a of the reverser switch. A corresponding contact is connected by wire 567a to the upper lefthand contact of the door control switch D S O. For the other doors wire 565 is connected through each door switch D S O to wire 555, as shown.

Wire 549 (Fig. 27—A) is connected by wire 568a to the lower lefthand contact of the door interlock switch which is interconnected by contact plate 569 to wire 570, which connects to one terminal of solenoid winding 513' which is grounded. Wires 507, 508 and 509 are connected by wires 577, 578, and 579 to the three lefthand contacts of the lower lefthand relay. Wires 577, 578 and 579 are connected by wires 580, 581 and 582 to wires 583, 584 and 585, respectively, which connect to the three righthand contacts of the relay controlled by solenoid winding 576. Wire 585 is connected by wire 586 to one of the wires of the lighting circuit 588. Wire 583 is connected through a switch and by wire 587 to the other wire of the lighting circuit 588. Lighting circuit 588 extends on the upper side of the car at the righthand end thereof, as shown, and includes a number of electric lights in parallel. Wires 583, 584 and 585 extend to the three righthand contacts of the lower righthand relay. Wire 577 is connected by wire 589 to one leg of a similar lighting circuit 591 for the upper lefthand end of the car. The other leg of this lighting circuit is connected by wire 590a through a switch to wire 590 which connects to wire 578. The lighting circuit 591 extends to the lefthand end of the car and comprises a number of lamps in parallel. Wire 590 extends into Fig. 27 and terminates on one leg of the lower lefthand lighting circuit 592. The other leg of this circuit is connected by wire 593 through a switch to wire 579. This lighting circuit 592 extends throughout the lower half of the car and comprises a number of lamps in parallel.

Wire 601 at the extreme lefthand of Fig. 27 is connected through coupler 600ª to the positive side of a current source and to a contact of the reverser switch which is interconnected by contact plate 602 with a corresponding contact. This corresponding contact is connected by wire 603 to the upper righthand contact of the extreme upper left door switch D S O. This door switch is connected in series with the other door switches through wires 604, 605, 606, 607, 608, 609, 610, 611, 612, 613 and 614 to the upper lefthand contact of the door interlock switch, through contact plate 615 thereof to wire 616 and thence on through the other door switches D S O by wires 617, 618, the other door interlock switch including contact plate 618ª, wire 619 and thence on through wires 620, 621, 622, 623, 624, 625, 626 to the contact of the other reverser switch controlled by contact plate 627. The contact plate 627 interconnects wire 626 with wires 628, which is connected to twin coupler 600ª, and to coupler 628ª. The other contact of twin coupler 600ª is connected to a suitable current source. Wires 601 and 628 are connected by a terminal 601ª and 628ª of the couplers at each end of the car, so that this circuit may be extended on through all the other cars of the train. The couplers 600ª are used at each end of the car or in the case of a train at each end thereof to connect the current source into this circuit.

Wire 705 extends from the coupler through contact plate 704 of the drum switch to wire 706, which extends all the way through the car to a corresponding contact 707 on the other drum switch and thence through wire 708 to the coupler at the other end of the car. Wire 713 which extends from the coupler may be connected with wire 712 by contact plate 709. Wire 712 extends all the way through the car to contact plate 713ª of the forward reverser. The other contact engageable by this plate is connected by wire 712ª to one contact of the righthand door switch D S O. This wire 712ª then extends through this door switch to wire 714 which extends through the car and connects with a suitable current source. Contact plate 710 of the lefthand drum switch in one position interconnects wire 715 which extends from the coupler with wire 715ª, which corresponds to wire 549 for the other side of the car. Contact plate 710 in another position interconnects wires 802 and 715ª. Contact plate 711 in one position interconnects wire 716 with wire 716ª which corresponds with wire 540 on the other side of the car. In the other position of contact plate 711, wires 803 and 716ª are interconnected.

Wire 720 connects the grounded voltage coil 721 of the brake valve with wire 559. At this point it should be noted that the controller master switch, brake valve, universal electric valve, air governor, synchronous governor and contactor form no part of this invention, but have been shown in the figures to illustrate their relation with the other parts of the novel circuits of this invention. This equipment is of standard, well known form used in modern transportation systems and need not be described in detail here.

At the head end of the car is a secondary signal 730 corresponding to the secondary signal 700 at the tail end of the car. This signal is connected by a push button switch 731 to wire 732, which is connected to wire 733 of the push button switch at the forward righthand end of the car. At this point it should be noted that there are four sets of push button switches which are the door push button switches and which have been labeled by the legends "Open", "Ret.", and "Closed". The door push button switch at the upper righthand end of the car and at the upper lefthand end of the car are for opening and closing the doors on the upper side of the car from either end thereof depending upon the setting of the drum switches. Likewise, the door push button switches at the lower righthand end of the car and at the lower lefthand end of the car are for opening and closing the doors on the lower side of the car from either end thereof depending upon the setting of the drum switches.

The operation of these circuits will now be described in detail. It will be assumed for the purposes of describing the apparatus and the circuits on this car that the motorman is at the motorman's station at the forward righthand end of the car and that the car is proceeding from left to right. Since the operation of the circuits on each side of the car for the doors is exactly the same, it will be assumed that that guard's station from which he opens and closes the doors is at the upper lefthand end of the car. The forward reverser switch adjacent the motorman's station, which is shown in Fig. 27—B in the neutral position, will be automatically moved to the forward position so that contact plates 627 and 713ª are out of engagement with their contacts, and contact plate 630 interconnects the righthand set of contacts which it controls. These reverser switches, their use and operation are old and well known in the art, and are in the form of drum switches controlled by a handle which can only be removed when the switch is in the position shown in Fig. 27—B. The motorman when he takes his station applies the handle to this switch and, if he is to proceed forwardly, moves the switch so that the plates move to the right to set up the circuits as just described. If the motorman wishes to drive the car backwardly he must move the handle of the reverser switch so that the contact plates move to the left to set up the same circuits just described. As is well known in the art, the reverser switch includes other contacts which are in the main driving motor control circuits so that the car may be operated in either direction. The contact plates 630, 627 and 713ª form part of this switch and are the only ones shown, since they are the only ones necessary to an understanding of this invention. All the other reverser switches at both ends of all the cars of the train and at the rear end of the head end car, which is the one in the figures, are in the position shown, so that the left-hand reverser switch is in a position so that contact plate 633 is out of engagement with any of its contacts, and contact plates 602 and 566ª are in the position shown. The motorman having moved his reverser switch forwardly for forward direction of travel may then propel the car forwardly by means of the main controller shown diagrammatically because it forms no part of this invention. The doors on both sides of the car are assumed to be closed and locked, and all the parts are in the position shown in the drawings with the main relays controlled by the solenoids 513′ and 576 in a position so that contact plates 539, 510, 511, 571ᶜ, 571ᵇ and 571ª are out of engagement with their contacts.

The plunger of the righthand relay is connected to the plunger of the lefthand relay by a bar 820, which is pivotally supported at 821, so that the switches controlled by each relay cannot be closed at the same time. The polyphase generator is generating alternating currents by reason of the fact that the motor 505 is energized from the third rail through contact shoe 500, wire 501, wire 502, wire 503, switch 504 and finally to the ground return.

When the car arrives at the station and stops the conductor presses the door opening button 554 at the lefthand end of the car. It will be assumed that the car has stopped at a lefthand platform, so that it is desired to open the doors on the upper side of the car with respect to Figs. 27, 27—A and 27—B. The drum switches at the forward end of the car will be in the "off" position, which is the position shown in the drawings. The drum switch for a single car will be in the "car" position, in which case the contact plates of the drum switch will be moved down to the lower set of contacts, interconnecting them as will be apparent from the drawings. When push button switch 554 is closed, current flows from the positive side of the suitable current source through wire 547, contact plate 546, wire 545, push button switch 544, wire 543, contact plate 548, wire 549, wire 550, and the solenoid winding 551 of the master door relay to ground. As a result, contact plates 553 and 560 are moved into engagement with their contacts. A holding circuit for the solenoid 551 is completed by means of the contact plate 553 as follows:—Current flows from the positive side of the current source through wire 547, contact plate 546, wire 545, through the contacts for the retaining circuit at the switch 544a, wire 554, contact plate 553, wire 552, and the winding 551 to ground. The current source which is connected to the wire 547 may be any suitable source obtained either from the third rail, or from one of the phases of the polyphase generator in normal operation. If one of the phases of the polyphase generator is used, one of the wires 507, 508 or 509 must be grounded to complete the return from the various apparatus that are grounded. Thus, the closing of push button switch 544 energizes the solenoid winding 551 which, in turn, completes a holding circuit for itself, so that the push button switch 544 need only be closed momentarily.

Contact plate 560 completes a circuit for the solenoid winding 562 of the door lock magnet as follows:—Current flows from the positive side of the suitable current source through wire 555, wire 559, contact plate 560, and thence to ground through the solenoid winding 562. This winding may be employed to act directly upon the rod 562a, or may be the winding of an electro-magnetically controlled compressed air valve to supply air to an air cylinder for operating the rod 562a. It should be remembered that this rod which is at present well known in the art extends throughout the length of the car for one set of doors, and a corresponding rod extends throughout the length of the car for the doors on the other side of the car. These rods provide mechanical locking means for all the doors, so that when the rod is moved by the energization of solenoid 562 all the doors are unlocked that are controlled by that rod. In this case it will be assumed that rod 562a controls in a well known manner the locking and unlocking of the doors on the upper side of the car. The moving of this rod also causes the operation of the door interlock switch, which is mechanically connected thereto by means of a bar which is shown. Thus contact plates 615, 563 and 569 move upwardly. Contact plate 615 moves out of engagement with the contacts which it normally rests against, and the other two contact plates move into engagement with their contacts. The motorman's indication lamps at his position, as indicated at 631, are deenergized by the movement of plate 615. The normal current flow in the circuit to these single lamps 631 is interrupted, signalling the motorman that the doors are unlocked. In other words, his indication to proceed is only given when the doors are not only closed but locked, so that when they are unlocked he knows that he should not proceed.

The circuit for these lamps has already been described in detail, and since it passes through the contact plate 615 of the door interlock switch as soon as the switch is moved from its normal position the circuit is broken so that the motorman's indication lights go out. The middle contact plate 563 of this switch completes a circuit to the conductor's indication lamps 600, signalling to him that the doors are unlocked. Here again, the doors must not only be closed but locked before the lamps 600 go out. The current for the conductor's indication lamps 600 flows from wire 555, through wire 559, contact plate 560, wire 561, contact plate 563, wire 564 and thence through the lamps 600 to ground. These lamps are usually mounted on the outside of the car at about the center, and when they are lighted the conductor knows for sure that the doors are unlocked and possibly open. Current also flows from wire 549, which is now energized from wire 554, through the master door relay, as already described, through wire 568a, contact plate 569, wire 570 and the solenoid winding 513′ of the main door opening relay to ground.

As a result, the switches controlled thereby are closed so that contact plates 539, 510 and 511 interconnect through contacts. Current then flows from the polyphase generator 506, through wires 507, 508 and 509; contact plates 539, 510 and 511; wires 513, 514 and 515; wires 517, 518 and 516; to all the door motors through wires 523, 521 and 522. The circuits through wires 517 and 518 are completed to the motors through the normally closed door switches D S C, as already described, while the current through wire 516 passes directly to the motors through wires 523. All the doors on the upper side of the car will now open with the exception of the last set of doors at each extreme end of the car for that side. It will be recalled that these doors do not open because the circuits for opening them, which pass through the end door cut-out switches in the case of a single car train, are both open because there is no air in the cylinders thereof. Just as the doors are fully opened the door switches will be opened, deenergizing the motors so that the current will not be on them after their door opening work is accomplished. The door switches D S O are also now shifted from the position shown in the drawings, when the doors are fully open, so that the circuits for the conductor's indication lamps 600 are now energized from wire 555, through the lefthand contact plate of each door switch D S O, as will be readily apparent. Thus, if for any reason the circuit to the conductor's indication lamp 600 is broken at the door interlock switch, even while the doors are open, the conductor's indication lamps 600 will remain burning so long as any door is open, since current thereto is supplied from wire 555, through D S O switches in parallel for all the doors. When the conductor desires to close the doors he merely momentarily depresses push button switch 544ª. This breaks the retaining circuit controlled by the back contacts of this switch and indicated by the symbol "Ret." in the drawings. This retaining circuit, it will be recalled, maintains the solenoid winding 551 energized, which, in turn, through the switch it controls energizes the door lock magnet winding 562. Lock solenoid 562 is also held energized through the circuit including switches D S O until the last door is closed. The circuit to 562 is then broken and the locks for all the doors move to locking position. When these windings are deenergized, the switches controlled thereby are allowed to return to normal position. The movement of the push button switch 544ª also completes a circuit to the main closing relay winding 576 as follows: Current flows from the positive side of the current source through wire 547, contact plate 546, wire 545, the lower set of contacts and the push button switch 544ª, wire 730, contact plate 541, wire 540, wire 574 and solenoid winding 576 to ground. As a result, the contact plates 571ª, 571ᵇ and 571ᶜ move into engagement with their contacts. It should be noted that the plungers of each of the main relays are pivotally interconnected by the bar 820, which is pivotally mounted at 821, so that both of the switches of the relays cannot be closed simultaneously. When one is closed the other must be open. If contacts controlled by both solenoids 513' and 576 were closed at the same time, generator 506 would be short-circuited. This provides a safety feature which is of particular value when a number of cars are connected into a train. Current now flows from the polyphase generator 506, through wires 507, 508 and 509; wires 577, 578 and 579; wires 580, 581 and 582; wires 583, 584 and 585; contact plates 571ᶜ, 571ᵇ and 571ª; wires 515ª, 515ᵇ and 515; wires 516ª, 516ᵇ and 516 directed to the motors through the wires 521, 522 and 523, without passing through switches, such as the D S C switches, as in the case of door opening.

As already described, these door closing circuits are arranged so that the door motors are energized in the reversed direction. As a result the doors close, D S C switches move back to their normal position as shown in the drawings, and the D S O switches also move back to their position shown in the drawings. This movement of the D S C switches arranges the circuits for the next door opening operation. This movement of the D S O switches breaks the parallel circuits to the conductor's indication lamp 600 and door lock magnet 562, so that when the doors are fully closed and locked so that the door interlock switch moves back to the position shown in the drawings the circuits to the motorman's indication lamps 631 will be completed to indicate to him that the doors are both locked and closed. As soon as the doors are closed and locked and push button 544ª is released, the springs on the main relays move switches controlled thereby to a normal position, which is that shown in the drawings. The car is now ready to proceed. If for any reason the motorman's indication lamps 631 do not light to signal him to proceed when the doors are closed and locked, the conductor can signal him to proceed by means of the secondary lamps 730 through a manually controlled circuit as follows:

In case of single car operation, or of operation of a train short enough to require only one man to operate the doors, the signal to proceed is given the motorman by the conventional method of operating a bell at the motorman's station by means of a rope passing through the car or cars.

In the case of a long train requiring two or more guards to operate the doors, the signal is passed from the rear guard to the guard next ahead of him as follows:

The drum switches at the guard's locations are in "car" position. The switches between are in either the "off" or "train" position. The circuit is as follows: the rear guard closes push button switch 702 and current flows from source through 547, 546, 545, 735, 702, 701ª, 703, 706, 707, 708, to next car, 705, 704 (or 703), 706, 707, 708 to next car, and so on. The circuit continues in this manner until it reaches the position of the next guard where, since the drum switch is in "car" position the current passes from 706 through contact plate 707ª, signal device 730 and then to ground. The guard at this station then signals the guard ahead in a similar manner and so on until the signal reaches the guard nearest the motorman. This guard then signals the motorman as before described for short trains.

The only difference in the operation of these circuits in a train comprising more than one car lies in the set of the drum switches which, as already stated, are well known in the art for similar uses and by means of which the various signalling and door control circuits may be extended through from one car to another for as many cars as are under control of any one conductor. Assuming that the train comprises nine cars divided into four groups comprising two groups of one car each and one group of three cars and one group of four cars (see Fig. 29) the drum switch at the forward end of the first car will be in "off" position, as shown in the drawings. The drum switch at the rear end of the first car and at the forward end of the second car will be in "car" position, and the drum switch at the rear end of the second car the forward and rear ends of the third car and the forward end of the fourth car will be in "train" position. The drum switch at the rear end of the fourth car and the forward end of the fifth car will be in "off" position. The drum switches at the rear end of the fifth car, both ends of the sixth and seventh cars and the forward end of the eighth car are in "train" position. The drum switches at the rear end of the eighth car and the forward end of the ninth car are in "car" position and the one at the rear end of the ninth car is in "off" position. The guards will be stationed between the first and second cars and the eighth and ninth cars from which points they may control all the doors for either side of the cars of adjacent units exactly in the manner as already described.

Current for the lighting circuit, including the wires 588, will be supplied from one phase of the generator through wires 586 and 587. Likewise, current for the lighting circuit, including the wires 591, will be supplied from one phase of the generator through wires 589, 590 and 590ª. Current for the lighting circuit, including the wires 592, is supplied from one phase of the generator through wires 590 and 593.

The other parts of the apparatus shown in the drawings and not specifically mentioned, comprising parts of the complete car equipment, are merely illustrated to show their association with the invention from the aspect that the normal storage battery equipment for such cars is considerably reduced in view of the fact that all the equipment in normal operation is operated from the polyphase generator, and such equipment which must be operable in an emergency, namely, the door locks, is supplied from a storage battery 55$^a$ through switch 56$^a$.

It will be apparent that instead of using the old type of door mechanism involving the rod 562$^a$, direct locking means may be employed of the type set forth in detail in Figs. 9, 10, 11 and 12. The other modified forms of the apparatus, as illustrated, may, of course, be employed in the main circuits of which only one complete main circuit is shown, since those skilled in the art could substitute the other forms of the apparatus in the main circuits.

It is within the scope of this invention to employ, as illustrated diagrammatically in Fig. 28, a rectifying tube converter, either of the vacuum or gas filled type, for converting direct current to alternating current or alternating current to direct current, in place of the motor generator set referred to above. Thus, in Fig. 28, which is on the same sheet with Figs. 7 and 8, the third rail current is supplied as before to wire 502, which wire is connected by wire 502$^a$ to the input of the rectifying tube converter, which has its other input terminal grounded. The polyphase output of this converter is delivered, as before, to wires 507, 508 and 509. Likewise, one skilled in the art could readily substitute such a convertor for the polyphase equipment and driving motor. Such convertors are known in the art in a number of different forms, and it is not necessary, therefore, to disclose the circuits and construction of such a convertor in detail.

From the foregoing disclosure it will be apparent that this invention resides in certain principles of construction and operation and circuital connections which may be embodied in other physical forms by those skilled in the art. We do not, therefore, desire to be strictly limited to this disclosure, but rather to the scope of the appended claims.

What we seek to secure by United States Letters Patent is:

1. A unitary structure for mounting in a door opening comprising a frame composed of top and bottom door guide track members and side members secured thereto to form a rigid portable open framework, a door having means operating in the guide track members for movably supporting the door and motor means mounted on the framework and operatively associated with the door to effect operation thereof in the framework, said structure being adapted to mounting in and removal from a door opening as a unit.

2. A unitary structure for mounting in a door opening comprising a frame composed of top and bottom door guide track members and side members secured thereto to form a rigid portable open framework, a door having means operating in the guide track members for movably supporting the door, and a linear induction motor for operating the door comprising field windings supported on said framework and an armature bar secured to the door adjacent the field windings.

3. A unitary structure for mounting in a door opening comprising a frame composed of top and bottom door guide track members and side members secured thereto to form a rigid portable open framework, a door having anti-friction means operating in the guide track members for movably supporting the door, motor means mounted on the framework and operatively associated with the door to effect operation thereof in the framework, said structure being adapted to mounting in and removal from a door opening as a unit, and said anti-friction means being adapted to absorb thrusts on the door in all directions.

4. A unitary structure for mounting in a door opening comprising a frame composed of top and bottom door guide track members and side members secured thereto to form a rigid portable open framework, a door having means operating in the guide track members for movably supporting the door, a linear motor mounted on the framework and operatively connected to the door, and a locking device for the door to lock it in open and closed position and released when the motor is energized to operate the door in either direction.

5. A unitary structure for mounting in a door opening comprising a frame composed of top and bottom door guide track members and side members secured thereto to form a rigid, portable, open framework, a door having means operating in the guide track member for movably supporting the door, a field winding supported by the framework, a linearly movable armature bar secured to the door adjacent the winding, and a brake bar engageable with said armature bar when said winding is energized.

6. The combination as described comprising an open frame work composed of united horizontal and vertical members, guide tracks on said frame work doors, anti-friction means operating in said tracks and attached to said doors for movably supporting the doors in the frame and motive device mounted on said frame and operatively connected to the doors for operating them.

7. The combination as described comprising an open frame work composed of united horizontal and vertical members, guide tracks on said frame work doors, anti-friction means operating in said tracks and attached to said doors for movably supporting the doors in the frame and braking and locking means actuated by the energization of the motive means for retarding the movement of the doors at the end of their stroke in either direction and for locking them in open or closed position.

JAMES S. DOYLE.
FRANK HEDLEY.